United States Patent
Strauss et al.

(10) Patent No.: US 10,445,823 B2
(45) Date of Patent: Oct. 15, 2019

(54) ADVANCED DATA SCIENCE SYSTEMS AND METHODS USEFUL FOR AUCTION PRICING OPTIMIZATION OVER NETWORK

(71) Applicant: ALG, Inc., Santa Monica, CA (US)

(72) Inventors: Oliver Thomas Strauss, Santa Barbara, CA (US); Morgan Scott Hansen, Santa Monica, CA (US)

(73) Assignee: ALG, Inc., Santa Monica, CA (US)

( * ) Notice: Subject to any disclaimer, the term of this patent is extended or adjusted under 35 U.S.C. 154(b) by 498 days.

(21) Appl. No.: 15/213,941

(22) Filed: Jul. 19, 2016

(65) Prior Publication Data

US 2017/0032456 A1 Feb. 2, 2017

Related U.S. Application Data

(60) Provisional application No. 62/197,256, filed on Jul. 27, 2015.

(51) Int. Cl.
*G06Q 30/00* (2012.01)
*G06Q 30/08* (2012.01)
*G06Q 30/02* (2012.01)

(52) U.S. Cl.
CPC ......... *G06Q 30/08* (2013.01); *G06Q 30/0283* (2013.01)

(58) Field of Classification Search
None
See application file for complete search history.

(56) References Cited

U.S. PATENT DOCUMENTS

| | | | |
|---|---|---|---|
| 7,050,982 B2 | 5/2006 | Sheinson | |
| 7,219,080 B1 | 5/2007 | Wagoner et al. | |
| 7,624,065 B2 | 11/2009 | Schoen et al. | |
| 7,835,982 B2 | 11/2010 | Schoen et al. | |
| 7,921,052 B2 | 4/2011 | Dabney et al. | |
| 8,112,325 B2 | 2/2012 | Foy et al. | |
| 8,126,881 B1 | 2/2012 | Sethi et al. | |
| 8,230,362 B2 | 7/2012 | Couch | |
| 8,326,845 B2 | 12/2012 | Sethi et al. | |
| 8,375,037 B2 | 2/2013 | Sethi et al. | |
| 8,521,619 B2 | 8/2013 | Perry, III et el. | |
| 8,538,828 B2 | 9/2013 | Skutta | |
| 8,595,082 B2 | 11/2013 | Skutta | |
| 8,868,572 B2 | 10/2014 | Sethi et al. | |
| 9,103,743 B2 | 8/2015 | Couch | |
| 9,104,718 B1 | 8/2015 | Levy et al. | |
| 9,189,960 B2 | 11/2015 | Couch et al. | |

(Continued)

*Primary Examiner* — Mila Airapetian
(74) *Attorney, Agent, or Firm* — Sprinkle IP Law Group

(57) ABSTRACT

An advanced data platform may receive an asset pricing request containing information about an asset. An optimization engine may determine a predicted price for the asset at different locations and times and compute a price matrix accordingly. The engine may identify an optimized predicted price from the price matrix, taking into account the spatial and temporal factors and various optimization conditions. A view for presentation of the optimized predicted price for the asset on a client device is generated and communicated to the client device over a network. When the asset is a vehicle, the engine may compute a linear regression model that defines a set of input variables with associated regression coefficients, the set of input variables comprising input variables representing attributes describing the vehicle.

20 Claims, 4 Drawing Sheets

(56) References Cited

U.S. PATENT DOCUMENTS

| | | |
|---|---|---|
| 9,324,104 B1 | 4/2016 | Levy et al. |
| 9,347,758 B2 | 5/2016 | Berent et al. |
| D765,089 S | 8/2016 | Agee |
| 9,412,203 B1 | 8/2016 | Garcia, III et al. |
| 9,465,873 B1 | 10/2016 | Franke et al. |
| 9,466,079 B2 | 10/2016 | Hygema et al. |
| D774,523 S | 12/2016 | Agee |
| D774,524 S | 12/2016 | Agee |
| 9,600,822 B2 | 3/2017 | Pyle et al. |
| 2006/0129423 A1 | 6/2006 | Sheinson et al. |
| 2010/0161408 A1 | 6/2010 | Karson et al. |
| 2010/0274571 A1 | 10/2010 | McFall et al. |
| 2010/0274631 A1 | 10/2010 | McFall et al. |
| 2011/0131652 A1 | 6/2011 | Robinson et al. |
| 2012/0005070 A1 | 1/2012 | McFall et al. |
| 2012/0130828 A1* | 5/2012 | Cooley .............. G06Q 30/0273 705/14.71 |
| 2012/0284087 A1 | 11/2012 | Pollak |
| 2012/0284113 A1 | 11/2012 | Pollak |
| 2013/0103597 A1* | 4/2013 | Fout ....................... G06Q 50/16 705/313 |
| 2013/0191247 A1 | 7/2013 | Huang et al. |
| 2013/0339173 A1 | 12/2013 | Skutta |
| 2014/0032352 A1 | 1/2014 | Fraser et al. |
| 2014/0032353 A1 | 1/2014 | Fraser et al. |
| 2014/0067615 A1 | 3/2014 | Park et al. |
| 2014/0089208 A1 | 3/2014 | Humble et al. |
| 2014/0278806 A1 | 9/2014 | Duguid et al. |
| 2014/0279171 A1 | 9/2014 | Burgiss et al. |
| 2014/0279275 A1 | 9/2014 | Burgiss et al. |
| 2014/0351074 A1 | 11/2014 | Enge et al. |
| 2015/0220876 A1 | 8/2015 | Sethi et al. |
| 2015/0356672 A1 | 12/2015 | Humble et al. |
| 2016/0343058 A1 | 11/2016 | Levy et al. |
| 2016/0371323 A1 | 12/2016 | Garcia, III et al. |

* cited by examiner

ADVANCED DATA SCIENCE SYSTEMS AND METHODS USEFUL FOR AUCTION PRICING OPTIMIZATION OVER NETWORK

CROSS-REFERENCE TO RELATED APPLICATION(S)

This application is a conversion of, and claims a benefit of priority under 35 U.S.C. § 119(e) from U.S. Provisional Application No. 62/197,256, filed Jul. 27, 2015, entitled "AUCTION PRICE OPTIMIZATION SYSTEM AND METHOD," which is fully incorporated by reference herein in its entirety, including the appendix.

COPYRIGHT NOTICE

A portion of the disclosure of this patent document contains material that is subject to copyright protection. The copyright owner has no objection to facsimile reproduction of the patent document or the patent disclosure as it appears in the Patent and Trademark Office patent file or records, but otherwise reserves all copyright rights thereto.

TECHNICAL FIELD

This disclosure relates generally to advanced data science systems and methods of processing transaction data on data platforms operating in a networked computing environment. More particularly, this disclosure relates to advanced data processing systems and methods for asset pricing optimization in a networked computing environment. Still more particularly, various representative embodiments disclosed herein relate to systems, methods and tools for analyzing and evaluating automotive data to predict and optimize automobile pricing. Even more particularly, various representative embodiments provide a new optimization engine configured for determining a maximum selling price of a subject vehicle at auction or wholesale relative to time and location, given a specific trim, options and vehicle history information associated with the subject vehicle.

BACKGROUND OF THE RELATED ART

Many challenges exist in auction pricing, particularly in used vehicle auction pricing. For example, one challenge is to accurately estimate the price a vehicle will command at auction given the subject vehicle's trim, options, condition, mileage and other factors that could potentially affect valuation of a subject vehicle. Due at least to the variability of data scarcity, size, and quality among disparate data sources and the computational power, memory, and data storage required, processing raw vehicle data can be cumbersome, time consuming, and prohibitively expensive. Moreover, while conventional auction pricing systems may provide simplified valuation mechanisms, they do not optimize auction valuations taking spatial (e.g., geographic location) and temporal (e.g., time-of-day, time-of-week, time-of-month, season-of-year) factors into account.

A conventional method qualitatively estimates wholesale values of used cars at a "global" or fixed level of vehicle grouping, independent of, e.g., location with respect to where the vehicle will be auctioned; e.g., all 2012 Ford Mustang GTs would be considered to have similar values. This method has several drawbacks. For example, the identified value may be inaccurate as a result of sparse data, especially for older vehicles. Additionally, if the location of the auction is ignored, fixed value estimates can be significantly inaccurate owing to substantial differences in demand for a given geographic market. For instance, the value of a 2014 Ford Mustang GT convertible being auctioned in Key West, Fla. may be significantly higher than the value it would command at auction in Estcourt Station, Me.

Another conventional method qualitatively estimates wholesale values for used cars at a fixed level of vehicle grouping, independent of, e.g., time-of-year. For instance, the value of a 2014 Ford Mustang GT convertible being auctioned in the month of June may be substantially higher than the value it would command at auction in January.

The inability to accurately determine the value of an asset, such as a used vehicle, can make it difficult for an asset owner, manager, or dealer such as an automobile dealer to buy and sell in a way that they can, with a degree of certainty, get a return on the maximum value of the asset. Consider an automobile dealer who must sell a given portion of used vehicle inventory at auction on, e.g., a quarterly basis to meet, e.g., lot turnover and year, make, model, trim distribution objectives. On one hand, the amount of profit realized by the automobile dealer will affect the decision to auction a particular vehicle or to try selling the vehicle at retail. On the other hand, maintaining a particular vehicle in inventory will have attendant costs relating to, e.g., transportation, repair, residence time on the dealer's lot, opportunity costs associated with another vehicle that might afford the dealer a larger profit, and/or the like.

The aforementioned predicament faced by an automobile dealer is only one example of what an asset owner, manager, or dealer may face, for instance, when a portfolio of assets or a portion thereof is up for auction or wholesale. When the price that each asset is likely to command at auction or for wholesale cannot be accurately determined, the individual pricing inaccuracies can add up to a significantly loss in profit. Furthermore, when an asset owner, manager, or dealer cannot accurately determine where and when an asset should be commissioned for auction or offer for sale to obtain the best price, the missed opportunities can significantly affect their bottom line. Consequently, there is room for innovations and improvements.

SUMMARY OF THE DISCLOSURE

Disclosed embodiments provide predictive pricing tools and pricing data through, e.g., an auction price optimization interface and information display presented to dealers. Data obtained thereby may assist dealers with the administration of inventory management, operation forecasting and commissioning of vehicles for sale at auction in order to realize the best price the vehicles are likely to command.

Disclosed predictive pricing tools analyze historical auction transaction data to quantitatively and intelligently predict prices at which various transactions are likely to occur at auction. Historical data can be leveraged to construct parameters for analysis in accordance with a representatively disclosed optimization model. Subject vehicle information and current supply/demand data (e.g., inventory and auction statistics) may be used to prepare a probability distribution of prices likely to be obtained at auction for a subject automobile. The resulting probability distribution may be converted to, or otherwise expressed in, an optimal auction price, taking into account factors such as spatial and temporal factors that were not considered in existing auction price valuation systems.

Representative auction pricing tools disclosed herein allow network clients (e.g., networked devices associated with dealers, original equipment manufacturers, auto finance captive companies, etc.) to predict auction values for vehicle assets via network access to a system that performs quantitative numerical analysis. Representative systems disclosed herein not only provide auction-based valuation for a particular VIN, trim, style, etc., but also provide auction price optimization functionality configured for optimizing profits and/or reducing costs associated with vehicle assets.

Representative embodiments disclosed herein provide advantages over conventional approaches for predicting the price a subject vehicle will command at auction. Inasmuch as there is not an auction value estimation formulation in the conventional art that incorporates spatial and temporal factors for optimizing the price a subject vehicle is likely to command at auction, significant advantages for automobile dealers (and other entities) may be achieved in accordance with various representative embodiments; e.g., straightforward identification of when and where to commission a vehicle for sale at auction. As compared with conventional approaches based on qualitative (subjective) past experiences that provide less accurate guidance on how to optimize values of their vehicle assets, representatively disclosed embodiments provide network clients with advanced data analysis tools for accurately pricing vehicle assets and quantitatively (objectively) optimizing profits and/or reducing costs associated with vehicle assets in a fast, efficient, consistent, reliable, and reproducible manner.

In some embodiments, a method for auction pricing optimization over a network may include a data platform receiving, from a client device communicatively connected thereto over the network, an asset pricing request containing information about an asset. The data platform may operate on at least one server machine and support a network site. An optimization engine running on the data platform may operate to determine a predicted price for the asset at each of a plurality of locations at each of a plurality of times. The optimization engine may operate to utilize the predicted prices thus determined and compute a price matrix containing a plurality of values for the predicted price, each value of the plurality of values associated with a specific location of the plurality of locations at a specific time of the plurality of times. The optimization engine may operate to identify, from among the plurality of values at the plurality of locations relative to the plurality of times in the price matrix, an optimized predicted price for the asset. This can be done by taking into account the spatial and temporal factors that may affect the predicted price at different locations and at different times in view of various optimization conditions. For example, the optimization engine may compare values associated with different times of the plurality of times relative to a given location of the plurality of locations; may compare values associated with different locations of the plurality of locations relative to a given time of the plurality of times; and may compare values associated with different locations of the plurality of locations at different times of the plurality of times relative to a given location of the plurality of locations at a given time of the plurality of times. A view for presentation of the optimized predicted price for the asset on the client device can be generated and communicated to the client device over the network.

In some embodiments, in determining the predicted price for the asset at each of the plurality of locations at each of the plurality of times, the optimization engine may operate to determine a predicted price for the asset at a given location at each of the plurality of times and also determine a predicted price for the asset at different locations of the plurality of locations other than the given location at each of the plurality of times. That is, the predicted price for the asset can be determined with respect to a given location for each of the plurality of times and with respect to a given time for each of the plurality of locations other than the given location.

In some embodiments, in determining the predicted price for the asset at each of the plurality of locations at each of the plurality of times, the optimization engine may operate to compute a regression model (in the form of an equation) that defines a set of input variables with associated regression coefficients, the set of input variables comprising a first input variable representing supply of the asset at a given location of the plurality of locations, a second input variable representing supply of the asset at different locations of the plurality of locations other than the given location, and a third input variable representing supply of competitive assets at the given location.

In some embodiments, the asset of interest can be a vehicle. In determining a predicted price for the vehicle at each of a plurality of locations at each of a plurality of times, the optimization engine may operate to compute a regression model that defines a set of input variables with associated regression coefficients, the set of input variables comprising input variables representing attributes describing the vehicle.

In some embodiments, the asset may comprise a plurality of assets. An asset pricing request for pricing a plurality of assets may contain information about each of the plurality of assets. In such cases, the optimization engine may operate to determine an optimized predicted price for each of the plurality of assets and generate a view accordingly.

In some embodiments, the asset may comprise a set of vehicles, in which case, information contained in an asset pricing request may include information about each of the set of vehicles. The optimization engine may operate to perform a valuation of the set of vehicles with respect to a plurality of locations and a plurality of times, treating the set of vehicles as a whole.

One embodiment comprises a system comprising at least one processor and at least one non-transitory computer-readable storage medium that stores computer instructions translatable by the at least one processor to perform a method substantially as described herein. Another embodiment comprises a computer program product having at least one non-transitory computer-readable storage medium that stores computer instructions translatable by at least one processor to perform a method substantially as described herein.

Numerous other embodiments are also possible. Skilled artisans appreciate that the representative embodiments of advanced data science systems and methods disclosed herein can find utility beyond automotive auction pricing systems. For example, suitable price prediction systems may implement the advanced data science systems and methods disclosed herein to efficiently and significantly optimize price predictions on various types of enterprise assets, commodities, and/or durable goods in addition to automobiles.

These, and other, aspects of the disclosure will be better appreciated and understood when considered in conjunction with the following description and the accompanying drawings. It should be understood, however, that the following description, while indicating various representative embodiments of the disclosure and numerous specific details thereof, is given by way of illustration and not of limitation. Many substitutions, modifications, additions and/or rearrangements may be made within the scope of the disclosure without departing from the spirit thereof, and the disclosure contemplates and includes all such substitutions, modifications, additions and/or rearrangements.

BRIEF DESCRIPTION OF THE DRAWINGS

The drawings accompanying and forming part of this specification are included to representatively depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein.

DETAILED DESCRIPTION

The invention and various features and advantageous details thereof are explained more fully with reference to the non-limiting embodiments that are representatively illustrated in the accompanying drawings and detailed in the following description. Descriptions of well-known starting materials, processing techniques, components and equipment are omitted so as not to obscure the invention in detail. It should be understood, however, that the detailed description and the specific examples, while indicating various representative embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein may be implemented in suitable computer-executable instructions that may reside on a computer readable medium (e.g., a hard disk (HD)), hardware circuitry and/or the like, or any combination thereof.

Figure 1:
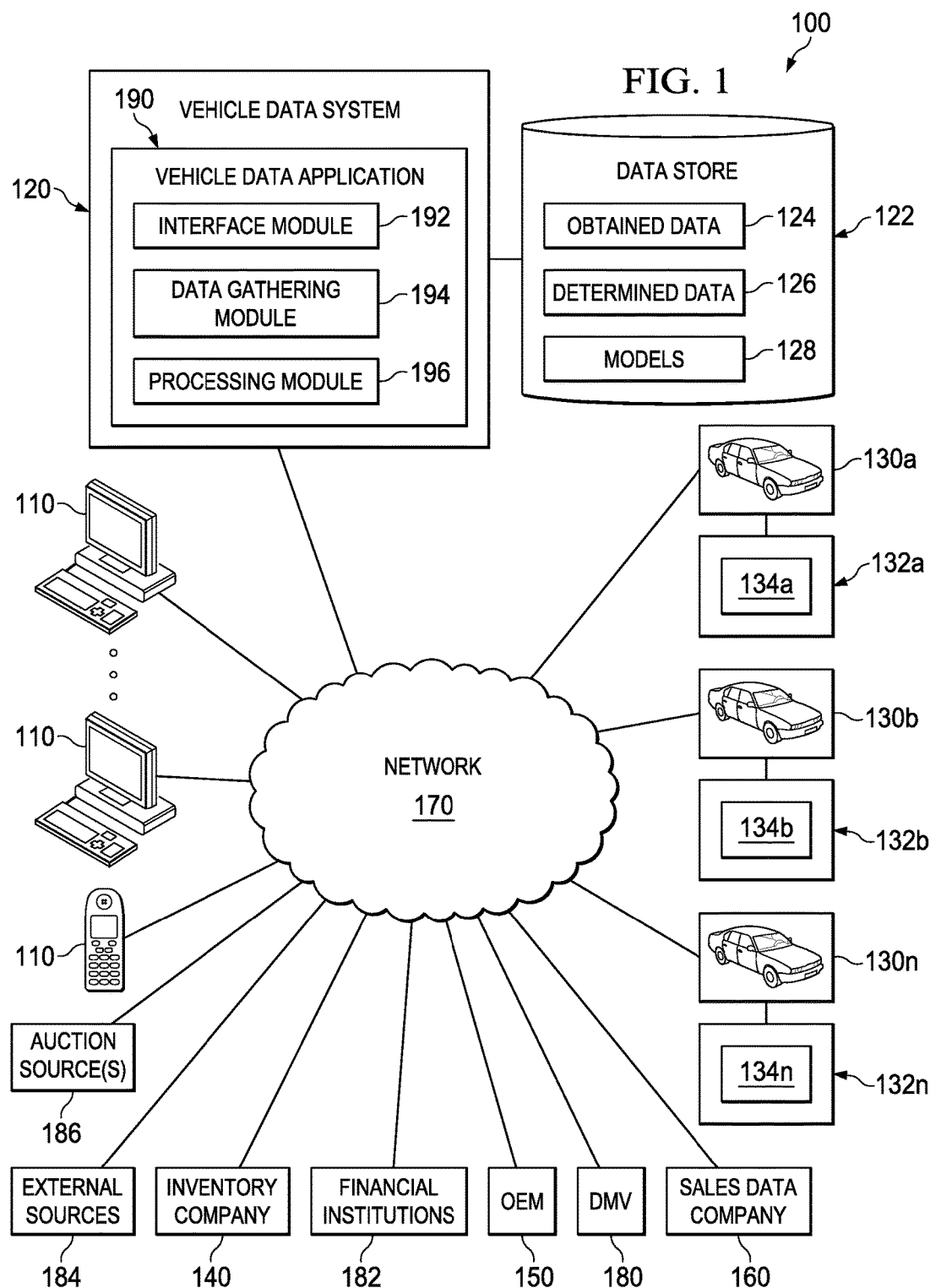
FIG. 1 depicts a representative example of a topology that includes a data platform operating in a networked computing environment where various embodiments of the systems and methods disclosed herein can be implemented.

FIG. 1 depicts a representative embodiment of a topology that may be used to implement various embodiments of the systems and methods disclosed herein. Topology 100 comprises a set of entities including vehicle data system 120 (also referred to herein as the "TrueCar" system or data platform) which operates on one or more server machines at the backend (e.g., behind a firewall of a private network at the server side) that supports a network site and that is coupled through network 170 to computing devices 110 (e.g., computer systems, personal data assistants, kiosks, dedicated terminals, mobile telephones, smart phones, etc.), and one or more computing devices at inventory companies 140, original equipment manufacturers (OEM) 150, sales data companies 160, financial institutions 182, external information sources 184, departments of motor vehicles (DMV) 180 and one or more associated point of sale locations; e.g., in this embodiment, car dealers 130a . . . 130n. Computing devices 110 may be used by consumers while conducting a search for consumer goods and/or services, such as automobiles. Network 170 may comprise, for example, a wireless or wired communication network such as the Internet or wide area network (WAN), publicly switched telephone network (PTSN) or any other type of electronic or non-electronic communication link such as mail, courier service, and/or the like.

Vehicle data system 120 may comprise one or more computer systems with computer processors executing instructions embodied on one or more non-transitory computer-readable media where the instructions are configured for performing at least some of the functionality associated with various representative embodiments disclosed herein. These applications may include a vehicle data application 190 comprising one or more applications (e.g., instructions embodied on one or more non-transitory computer-readable media) configured to implement an interface module 192, data gathering module 194, and processing module 196 utilized by the vehicle data system 120. Furthermore, vehicle data system 120 may include data store 122 operable to store obtained data 124, data 126 determined during operation, models 128 that may comprise a set of dealer cost model or price ratio models, or any other type of data associated with various embodiments disclosed herein or determined during implementation of such embodiments.

Vehicle data system 120 may provide a wide degree of functionality, including utilizing one or more interfaces 192 configured to, for example, receive and respond to queries from users at computing devices 110; interface with inventory companies 140, manufacturers 150, sales data companies 160, financial institutions 182, auction source(s) 186, DMVs 180 or dealers 130a . . . 130n to obtain data; or provide data obtained, or determined, by vehicle data system 120 to any of inventory companies 140, manufacturers 150, sales data companies 160, financial institutions 182, DMVs 180, external data sources 184 or dealers 130a . . . 130n. It will be understood that a particular interface 192 utilized in a given context may depend on the functionality being implemented by vehicle data system 120, the type of network 170 utilized to communicate with any particular entity, the type of data to be obtained or presented, the time interval at which data is obtained from the entities, the types of systems utilized at the various entities, etc. Accordingly, these interfaces may include, for example, web pages, web services, a data entry or database application to which data can be entered or otherwise accessed by an operator, or almost any other type of interface which may be desirable for use in a particular context.

In general, vehicle data system 120 may obtain data from a variety of sources via operation of interface 192, including one or more inventory companies 140, manufacturers 150, sales data companies 160, financial institutions 182, DMVs 180, external data sources 184 or dealers 130a . . . 130n and store such data in data store 122. This data may then be grouped, analyzed or otherwise processed by vehicle data system 120 to determine, e.g., desired data 126, or for implementation in models 128 which may also be stored in data store 122.

A user at computing device 110 may access the vehicle data system 120 through the provided interface(s) 192 and specify certain parameters, such as a desired vehicle configuration or incentive data the user wishes to apply, if any. Vehicle data system 120 can select a particular set of data in the data store 122 based on the user-specified parameters, process the data set using processing module 196 and models 128, generate interface(s) using interface module 192 using the selected data set on computing devices 110 and data determined from the processing, and present interfaces to the user at the user's computing device 110. Interface(s) 192 may visually/graphically present the selected data set to the user in a highly intuitive and useful manner.

A visual interface may present at least a portion of the selected data set as a price curve, bar chart, histogram, etc. that reflects quantifiable prices or price ranges (e.g., "average," "good," "great," "overpriced," etc.) relative to reference pricing data points (e.g., invoice price, MSRP, dealer cost, market average, internet average, etc.). Using these types of visual presentations may enable a user to better understand the pricing data related to a specific vehicle configuration. Additionally, by presenting data corresponding to different vehicle configurations in a substantially identical manner, a user can readily make comparisons between pricing data associated with different vehicle configurations. To further aid the understanding for a user of the presented data, the interface may also present data related to incentives which were utilized to determine the presented data or how such incentives were applied to determine presented data.

Turning to various other elements of topology 100, dealer 130a may be a retail outlet for consumer goods and/or services, such as vehicles manufactured by one or more of OEMs 150. Dealer 130a may employ a dealer management system (DMS) 132a to track or otherwise manage sales, finance, parts, service, inventory, and back office administration functions. Since many DMSs 132a . . . 132n are Active Server Pages (ASP) based, transaction data 134a . . . 134n (e.g., transaction data 134a) may be obtained directly from a DMS (e.g., DMS 132a) with a "key" (e.g., an ID and password with set permissions within DMS 132a) that enables data to be retrieved from the DMS (in this example, DMS 132a). Many dealers 130a . . . 130n may also have one or more web sites that may be accessed over network 170, where pricing data pertinent to a dealer may be presented on those web sites, including any predetermined, or upfront pricing. This price is typically termed the "no haggle" price (i.e., price without negotiation), and may be deemed a "fair" price by vehicle data system 120. To the extent a DMS also tracks and/or manages auction data, vehicle data system 120 may obtain or receive auction data from the DMS to compute and optimize prices for wholesale/auction market(s). Additionally or alternatively, vehicle data system 120 may obtain or receive auction data from auction source(s) 186.

Inventory companies 140 may comprise one or more inventory polling companies, inventory management companies or listing aggregators which may obtain and store inventory data from one or more of dealers 130a . . . 130n (for example, obtaining such data from DMSs 132a . . . 132n). Inventory polling companies are typically commissioned by the dealer to pull data from DMSs 132a . . . 132n and format the data for use on web sites and by other systems. Inventory management companies manually upload inventory information (e.g., photos, description, specifications) on behalf of the dealer. Listing aggregators get their data by "scraping" or "spidering" web sites that display inventory content and receiving direct feeds from listing web sites (for example, AutoTrader.com, FordVehicles.com, etc.). In addition to retail inventory data or listings, one or more inventory polling companies, inventory management companies and/or listing aggregators may obtain and store inventory data from auction sources such as auction houses. Inventory data at auction provides an indication of a possible supply at a certain auction and can be used to determine the impact on price.

DMVs 180 may collectively include any type of government entity to which a user provides data related to a vehicle. For example, when a user purchases a vehicle, it must be registered with the state (for example, DMV, Secretary of State, etc.) for tax and titling purposes. This data typically includes vehicle attributes (for example, year, make, model, mileage, etc.) and sales transaction prices for tax purposes.

Financial institution 182 may be any entity such as a bank, savings and loan, credit union, etc. that provides any type of financial services to a participant involved in the purchase of a vehicle. For example, when a buyer purchases a vehicle, they may utilize a loan from a financial institution, where the loan process usually requires two steps: applying for the loan and contracting the loan. These two steps may utilize vehicle and consumer information in order for the financial institution to properly assess and understand the risk profile of the loan. Typically, both the loan application and loan agreement include proposed and actual sales prices of the vehicle.

Sales data companies 160 may include any entities that collect any type of vehicle sales data. For example, syndicated sales data companies aggregate new and used sales transaction data from DMSs 132a . . . 132n of particular dealers 130a . . . 130n. These companies may have formal agreements with dealers 130a . . . 130n that enable them to retrieve data from dealers 130a . . . 130n in order to syndicate the collected data for the purposes of internal analysis or external purchase of the data by other data companies, dealers, and OEMs.

Manufacturers 150 may comprise entities that actually build the vehicles sold by dealers 130a . . . 130n. To guide the pricing of their vehicles, manufacturers 150 may provide an Invoice price and a Manufacturer's Suggested Retail Price (MSRP) for both vehicles and options for those vehicles to be used as general guidelines for the dealer's cost and price. These fixed prices are set by the manufacturer and may vary slightly by geographic region.

External information sources 184 may comprise any number of other various sources, online or otherwise, which may provide other types of desired data; for example, data associated with vehicles, pricing, demographics, economic conditions, markets, locale(s), consumers, etc.

It should be here noted that not all of the various entities depicted in topology 100 are necessary, or even desired, in representative embodiments disclosed herein, and that certain functionality described with respect to the entities representatively depicted in topology 100 may be combined into a single entity or eliminated altogether. Additionally, in some embodiments other data sources not shown in topology 100 may be utilized. Topology 100 is therefore presented for illustrative purposes only and should in no way be taken as imposing any limitations on various embodiments disclosed herein.

Figure 2:
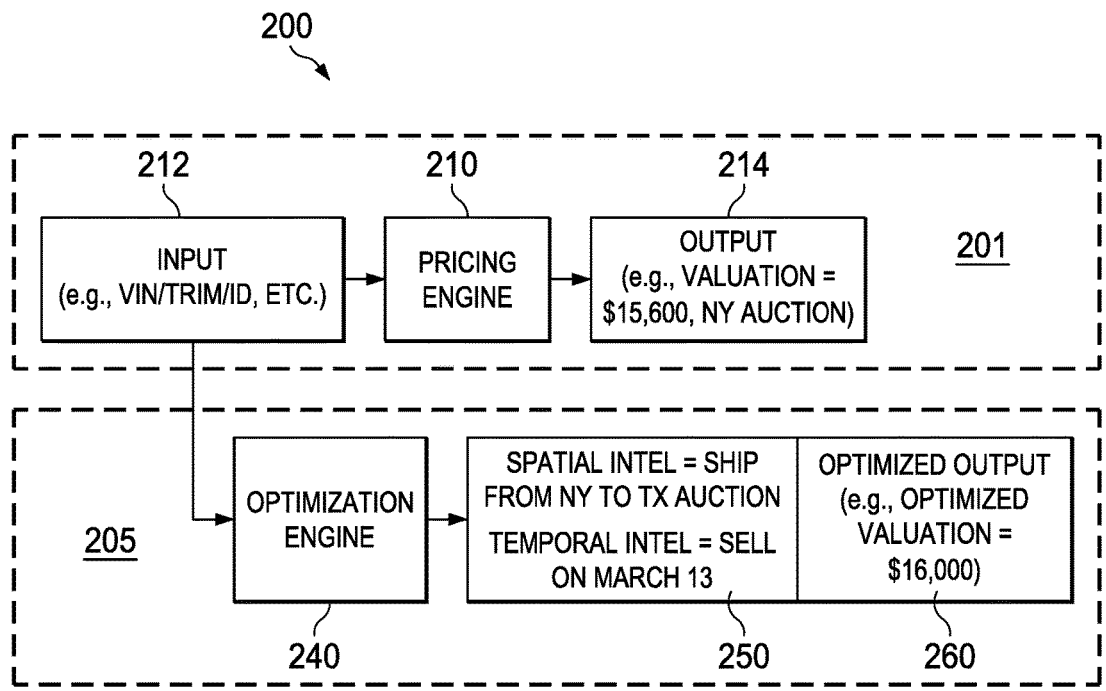
FIG. 2 depicts a diagrammatic representation of an example pricing system that includes an optimization engine driven by advanced data science methods disclosed herein according to some embodiments.

FIG. 2 depicts a diagrammatic representation of example pricing system 200 that may reside in topology 100 of FIG. 1 and that may be implemented as part of vehicle data system 120 described above. In this example, system 200 includes pricing engine 210 and optimization engine 240 driven by advanced data science methods disclosed herein according to some embodiments As generally depicted in FIG. 2, system 200 may implement data processing process 201 and advanced data processing process 205. Process 201 may be configured for predicting the price an item of interest (which, as a non-limiting example, can be a subject vehicle) is expected to command at auction.

More specifically, process 201 may entail providing input 212 containing vehicle information for a subject vehicle to pricing engine 210. Input 212, or at least a portion thereof, may include information received by system 200 (e.g., an embodiment of vehicle data system 120 of FIG. 1) from a client device (e.g., client device 110) over a network (e.g., network 170). Examples of vehicle information that may be included in input 212 may include the vehicle identification number (VIN) for the subject vehicle, a trim identifier associated with the VI N, a standardized or normalized identifier (e.g., a "Chrome style" identifier used by automotive web sites to obtain automotive data such as car styles, as known to those skilled in the art, see e.g., www.chromedata.com).

The client device may be associated with a user (e.g., a visitor of a network site supported by system 200, an employee of an auction house such as auction source 186, an authorized user of a dealer such as dealer 130a, etc.). Information received from the client device may include a request for auction pricing prediction for the subject vehicle and vehicle data for the subject vehicle. In response to the request, system 200 may prepare input 212 based on the vehicle data. Preparation of input 212 may include, for instance, determining what data is needed in addition to the information received from the client device, gathering additional data from a data store (e.g., data store 122) and/or disparate data sources (e.g., one or more data sources communicatively coupled to vehicle data system 120 over network 170). Alternatively or additionally, preparation of input 212 may include translating, formatting, and/or converting the received data into a format supported by pricing engine 210. The prepared input 212 is then communicated to pricing engine 210.

Alternatively or additionally, system 200 may determine auction pricing prediction for a set of assets, generate a valuation report or visualization (e.g., a view for presentation on the client device via a user interface) listing the predicted prices for the set of assets, and communicate the valuation report or visualization to a client device over a network, perhaps on demand or automatically on a periodic basis.

Based on input 212, pricing engine 210 may operate to determine output 214. Output 214 may contain a price valuation, representing a price that the subject vehicle is expected to command at auction or wholesale (e.g., trade or sale in bulk or large quantities) based on historical transaction data associated with a plurality of vehicles having the same or similar vehicle characteristics as the subject vehicle (e.g., the same or similar year, make, model, trim, mileage, and/or condition). The historical transaction data may be obtained from disparate sources and stored in a data store accessible by pricing engine 210 (e.g., data store 122 described above). Pricing engine 210 may include any suitable price valuation tools capable of determining a price that a subject vehicle is, to a certain degree of confidence, expected to command at auction or wholesale.

To augment pricing engine 210, and the output that it produces, system 200 may further include advanced data processing process 205 implementing a robust price and profit optimization mechanism. As illustrated in FIG. 2, in some embodiments, process 205 may include providing the same input 212 to optimization engine 240 (also referred to herein as intelligence engine 240). In this case, information received from the client device may include a request for auction pricing optimization for a subject vehicle and vehicle data for the subject vehicle. In response to the request, system 200 may prepare input 212 for optimization engine 240 based on the vehicle data. Preparation of input 212 for optimization engine 240 may be the same or similar to preparation of input 212 for pricing engine 210 described above. The prepared input 212 is then communicated to optimization engine 240. Based on input 212, optimization engine 240 may operate to evaluate spatial and temporal factors 250 to determine optimized price valuation 260, representing a quantitatively optimized price that the subject vehicle is predicted to command at auction.

Alternatively or additionally, system 200 may determine auction pricing optimization for a set of assets, generate a valuation report or visualization (e.g., a view for presentation on the client device via a user interface) listing the optimized predicted prices with associated times and locations, and communicate the valuation report or visualization to a client device over a network, perhaps on demand or automatically on a periodic basis.

According to some embodiments, to realize the robust price and profit optimization mechanism, optimization engine 240 may implement the following optimization engine algorithm and linear regression equations. Linear or non-linear regression models may be implemented. For illustrative purposes, a linear regression is modeled below. Programming techniques necessary to compute the linear regression modeled below are known to those skilled in the art.

Predicted price k at current location l and time t=0 (i.e., $p_{k,\ Current\ l, t=0}$) where $$p_{k, Current\ l, t=0} = \Sigma\beta1 Location_{Current\ l} + \beta2\ Supply_{k, Current\ l} + \beta3\ Demand_{k, Current\ l} + \beta4 CompSet\ Supply_{k-i, Current\ l} + \Sigma\beta5 VIN\ Attributes_{k, Current\ l} + \Sigma\beta6 AuctionCharacteristics_{Current\ l} + \beta7 p_{historic, k, Current\ l} + \rho\beta8 Seasonality_{pk} + e \quad \text{Equation [1]}$$

Predicted price k at current location and time t+1, t+2, ... t+n (i.e., $p_{k,\ Current\ l, t>0}$) where $$p_{k, Current\ l, t>0} = \Sigma\beta1 Location_{Current\ l} + \beta2\ Supply_{k, Current\ l} + \beta3\ Demand_{k, Current\ l} + \beta4 CompSet\ Supply_{k-i, Current\ l} + \Sigma\beta5 VIN\ Attributes_{k, Current\ l} + \Sigma\beta6 AuctionCharacteristics_{Current\ l} + \beta7 p_{historic\ k, Current\ l} + \Sigma\beta8 Seasonality_{pk} + e \quad \text{Equation [2]}$$

Predicted price k at new location l ($\neq$current location l) and time t=0,t+1, ... t+n) (i.e., $p_{k,\ New\ l, t=0, t+1\ ...\ t+n}$) where $$p_{k, New\ l, t=0, t+1\ ...\ t+n} = \Sigma\beta1 Location_{New} + \beta2\ Supply_{k, New\ l} + \beta3 Supply_{Current\ l} + \beta4\ Demand_{k, New\ l} + \beta5 CompSet\ Supply_{k-i, New\ l} + \Sigma\beta6 VIN\ Attributes_{k, New\ l} + \beta7\ Shipping_{k, New\ l} + \rho\beta8 Auction\ Characteristics_{New\ l} + \beta9 p_{historic\ k, Current\ l} + \beta10 p_{historic\ k, l=\Sigma l=Current\ l} + \Sigma\beta11 Seasonality_{pk, t=0} \quad \text{Equation [3]}$$

Feature components (e.g., input variables with their regression coefficients) of the above Equations [1], [2], and [3] are described in Table 1 below. Skilled artisans appreciate that, although Equations [1], [2], and [3] are exemplified in view of auction pricing of a subject vehicle, they can be adapted for pricing other types of assets. Thus, Equations [1], [2], and [3] and Table 1 are meant to be illustrative and non-limiting.

TABLE 1

| | |
|---|---|
| k | Vehicle k at VIN level (with associated submake, series s and make b) |
| Current l, t = 0 | Current auction location l (l = 1, 2, . . . m) and current time t (t = 0) |
| Current l, t > 0 | Current auction location l (l = 1, 2, . . . m) and time t (t > 0) |
| New l, t = 0, t + 1, . . . t + n | New auction location l (l = 1, 2, . . . m, l ≠ current l) at time t (t = 0, t + 1, . . . t + n) |
| $p_{k,New\ l,t=0,t+1,\ldots\ t+n}$ | Predicted price at either new location l and time equal to either current (t = 0) or different (t + 1, . . . t + n) |
| $p_{k,Current\ l,t=0}$ | Predicted price at current auction location and time (t = 0) |
| $p_{k,Current\ l,t>0}$ | Predicted price at current auction location and time (t > 0) |
| ΣβLocation | Auction location l (1, 2, . . . m) and its influence on auction price. β represents regression coefficients. |
| βSupply | Supply or inventory of vehicle k |
| βDemand | Demand of vehicle k (measured as estimated amount of bidders at auction via proxy of using dealers around location buying model k which, as a non-limiting example, can be stored as part of models 128 in data store 122) |
| βCompSetSupply | Supply or inventory of competitive set k-i |
| βShipping | Shipping cost from current location l to new location l |
| ΣβVINAttributes | Vehicle attributes of vehicle k (i.e., age, mileage, color, drive train, body style, fuel type) |
| ΣβAuctionCharacteristics | Characteristics of auction location (i.e., # of lanes, lane 1 or not, region, # of makes sold at auction) |
| $Σβ\text{Seasonality}_{p\ k}$ | Monthly seasonality of historic prices |
| $βp_{historic}$ | Historic auction prices for vehicle k at particular auction for time range of t-n (i.e., last four weeks) >> default of binning structure but may have to be redefined as sample size could be small |
| Condition a | Optimization conditions: |
| $p_{k,Current\ l,t>0} > p_{k,Current\ l,t=0}$ | a) where price for vehicle k at current location l at t > 0 is greater than price for vehicle at current location l at t = 0 |
| Condition b $p_{k,New\ l,t=0} > p_{k,Current\ l,t=0}$ | b) price for vehicle k at new location l at t = 0 is greater than price for vehicle k at current at t = 0 |
| Condition c $p_{k,New\ l,t>0} > p_{k,Current\ l,t=0}$ | c) price for vehicle k at new location l and t > 0 is greater than price for vehicle k at current location l at t = 0 |

Following the example shown in FIG. 2, suppose a subject vehicle is expected to command a price of $15,600 USD (e.g., output 214 from data processing process 201) for auctioning the subject vehicle where it is located (e.g., New York), optimization engine 240 may receive input 212 and take into account the spatial and temporal factors 250 that affect the subject vehicle at computing time and quantitatively determine that the subject vehicle may command a higher auction price of $16,000 at a different location (e.g., Texas) and at a time (e.g., March 13) that is different from the current time. In this case, optimized price valuation 260 from advanced data processing process 205 (which implements the robust price and profit optimization mechanism embodying the equations described above) represents an additional $400 potential gross profit to the owner of the subject vehicle (e.g., an automotive dealer, an automotive manufacturer, a fleet management company, a vehicle leasing company, an auction company, etc.).

Suppose the subject vehicle is one of five-hundred vehicles up for auction and $400 represents the average increase (i.e., optimized auction pricing) determined by optimization engine 240, the difference between a regular pricing engine output and an optimized outcome by optimization engine 240 can be quite substantial (in this example, $20,000). As the size of an asset portfolio increases, this substantial increase can be magnified even more significantly.

Figure 3:
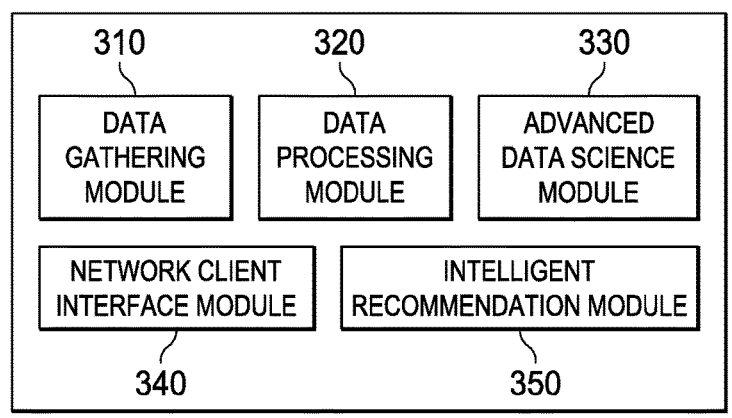
FIG. 3 depicts a diagrammatic representation of functional modules of another example pricing system according to some embodiments.

While the robust price and profit optimization mechanism of advanced data processing process 205 is realized by optimization engine 240 of FIG. 2 in the above example, skilled artisans appreciate that other implementations are also possible. For example, FIG. 3 depicts a diagrammatic representation of pricing system 300 comprising functional modules 310, 320, 330, 340, and 350 configured for performing data processing process 201 and advanced data processing process 205 of FIG. 2 in topology 100 of FIG. 1 described above.

As a non-limiting example, data gathering module 310 may implement an embodiment of data gathering module 194, data processing module 320 may implement an embodiment of pricing engine 210, advanced data science module may implement an embodiment of optimization engine 240, network client interface module 340 may implement an embodiment of interface module 192, and intelligent recommendation module 350 may implement an optional recommendation engine, according to some embodiments.

Figure 4:
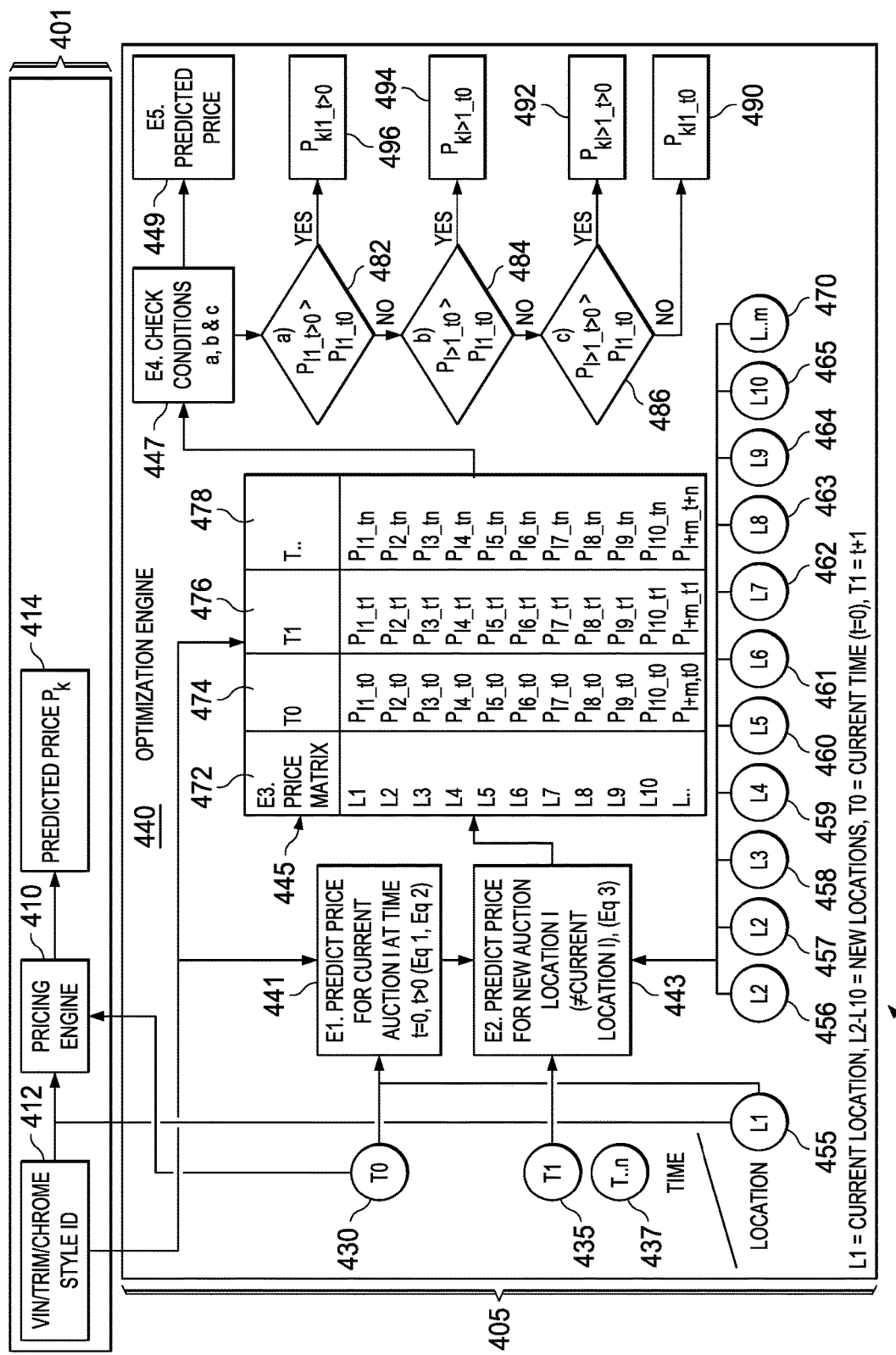
FIG. 4 depicts a diagrammatic representation of data analysis and computation components of an example optimization engine according to some embodiments.

FIG. 4 depicts a diagrammatic representation of pricing system 400 having pricing engine 410 implementing data processing process 401 and optimization engine 440 implementing advanced data processing process 405. Data processing process 401 with input 412 and output 414 may operate similar to data processing process 201 with input 212 and output 214 described above, while advanced data processing process 405 may be realized by various data analysis and computation components of optimization engine 440 described below.

As generally depicted in FIG. 4, data processing process 401 for predicting the price that a subject vehicle is expected to command, for instance, at auction or wholesale may include providing input 412 containing vehicle information (e.g., VIN, trim, body style, etc.) of the subject vehicle. Pricing engine 410 may employ any suitable pricing tools to determine output 414 containing a price valuation representing a price that the subject vehicle is expected to command at auction or wholesale.

As a non-limiting example, suppose the subject vehicle is a 2012 Camry LE and a sale date in March 2015 was selected to predict price in April 2015. For the purpose of illustration, and not of limitation, auction records may include the following fields:

TABLE 2

| FIELD NAME: | FIELD DESCRIPTION: |
|---|---|
| Sale Date | MM/DD/YYYY = Mar. 9, 2015 |
| VIC | NADA vehicle identification code—a copyrighted, proprietary identifier = 111637948 |
| Make | Make Description = Toyota |
| Model Year | 4 Digit MY = 2012 |
| Submake | Submake Description = Camry |
| Series | Series Description = Camry 4-cyl |
| Bodystyle | Bodystyle Description = Sedan 4D LE |
| Fuel Type/Drive Type | Fuel Type Description = Gasoline, Drive Type |
| Identifier | Description = FWD, AT |
| Region | Region Code = H (NADA descriptions) >> location |
| Sale Price | Actual Sale Price = $13,600 |
| Mileage | Actual Odometer Mileage = 39,444 |
| Color | Color Description = Red |
| Sale Type | Sale Code = D (Dealer) |
| VIN | Vehicle Identification Number = 4T1BF1FK5CU000000 |

In some embodiments, optimization engine 440 can be configured to perform steps E1 . . . E5 (elements 441, 443, 445, 447, and 449) shown in FIG. 4.

E1 (441)—Determine a predicted price $p_k$ for the subject vehicle (i.e., an example of an asset of interest) at a particular location l at each of a plurality of times t. When time t equals the initial time point (t=0), Equation [1] is used.

Example of Equation [1]

$$p_{k,Current\ l,t=0} = \rho\beta 1 Location_{Current\ l} + \beta 2\ Supply_{k,Current\ l} + \beta 3\ Demand_{k,Current\ l} + \beta 4 CompSet\ Supply_{k-i,Current\ l} + \Sigma\beta 5 VIN\ Attributes_{k,Current\ l} + \Sigma\beta 6 AuctionCharacteristics_{Current\ l} + \beta 7 p_{historic,k,Current\ l} + \Sigma\beta 8 Seasonality_{pk} + e$$

Suppose the location l is the current auction location, then l=1 is selected, given the following:

$\Sigma\beta Location = \beta 1*Location\ 1(Location\ 1=1) + \beta 11*Location\ 2(Location\ 2=0) + \beta 12*Location\ 3(Location\ 3=0) + \beta 13*Location\ 4(Location\ 4=0) + \beta 14*Location\ 5(Location\ 5=0) + \beta 15*Location\ 6(Location\ 6=0) + \beta 16*Location\ 7(Location\ 7=0) + \beta 17*Location\ 8(Location\ 8=0) + \beta 18*Location\ 9(Location\ 9=0) + \beta 19*Location\ 10(Location\ 10=0)$ $\beta Supply\ Current\ l(l1) = \beta 2*supply\ of\ vehicle\ k$ (same body style)=$\beta 2*20$ (e.g., 20 vehicles at the current location have the same body style)

$\beta Demand\ Current\ l(l1) = \beta 3*15$ (approximated by the number of dealers, in this example, 15, that buy vehicle k/submakes in a predetermined radius, for instance, 30 miles within the current location)

$\beta CompSetSupply\ location\ l(l1) = \beta 4*30$ (competitive body styles of k-i models, for instance, Honda Accord, Ford Fusion, Chevy Malibu, Hyundai Sonata, Nissan Altima, etc. auctioned off at the current location)

$\Sigma\beta VINAttributes = \Sigma\beta 5*VIN$ attributes (e.g., age, mileage, color, drive train, body style, fuel type)=$\beta 51*36$ months(age)+$\beta 52*39,444$ (mileage)+$\beta 531*Red$ (=1 if red, else=0)+$\beta 532*White$ (=1 if white, else=0)+$\beta 533*Black$(=1 if black, else=0)+$\beta 534*Silver$(=1 if silver, else=0)+$\beta 541*FWD$(=1 if FWD, else=0)+$\beta 542*AWD/4WD$(=1 if AWD/4WD, else=0)+$\beta 551*AT$(=1 if AT, else=0)+$\beta 552*MT$(=1 if MT, else=0)+$\beta 561*Gasoline$(=1 if Gas,=0 if not)+$\beta 562*Diesel$(=1 if Diesel,=0 if not)+$\beta 563*Electric$(=1 if Electric,=0 if not)+$\beta 564*Hybrid$(=1 if Hybrid,=0 if not)

$\Sigma\beta AuctionCharacteristics\ Current\ l(l1) = \beta 61*10$ (the number of lanes, in this example, 10, in auction house at the current location)+$\beta 62*1$(=1 if lane 1,=0 if not),$\beta 631*West$(=1 if West,=0 if not)+$\beta 632*East$(=1 if East,=0 if not)+$\beta 633*South$(=1 if South,=0 if not)+$\beta 634*North$(=1 if North,=0 if not)+$\beta 64*10$ (the number of makes sold at the current location l and on date i(t=0))

$\beta p_{k\ historic\ Current\ l,\ t=0} = \beta 7*$13,750$ (average historic price of vehicle k at the current location(l=1) in the last four weeks)

$\Sigma\beta Seasonality_{pk,t=0} = \beta 81*Jan$(=1 if (t=0)=Jan)+$\beta 81*Feb+\ldots\beta 84*Apr$(=1 if (t=0)=April)+$\ldots+\beta 812*Dec$ Values of these features can be determined in many ways. For example, the supply and demand can be determined using obtained data 124 from dealers 130a . . . 130n and/or determined data 126 stored in data store 122; a VIN decoder may be utilized to decode the VIN and determine the values of the VIN attributes; auction characteristics at the current location can be obtained from auction source(s) 186, obtained data 124, and/or determined data 126 stored in data store 122; and the average historic price and seasonality can be determined using obtained data 124 from dealers 130a . . . 130n, determined data 126, and/or models 128 stored in data store 122. Furthermore, Boolean values may be used to transform non-numerical values (e.g., color, drive train, body style, fuel type, etc.).

Skilled artisans appreciate that statistical software refer to specialized computer programs for analysis in statistics and that many such programs are suitable for statistical modeling. Computation of Equation [1] exemplified above can be realized by leveraging computerized statistical analysis techniques known to those skilled in the art. Linear regression or other suitable statistical models implementing the special linear regression equations disclosed herein may be stored as part of models 128 in data store 122 such that they are accessible by pricing systems implementing embodiments disclosed here. As a non-limiting example, applying Equation [1] at the current location l (l=1) and time t (t=0) generates a first price of $14,000 such that $p_{k,\ Current\ l=1,\ t=0}$=$14,000.

When time t is subsequent to the initial time point (t>0), Equation [2] is used. As a non-limiting example, applying Equation [2] at the current location l (l=1) and time t (t=1) generates a second price of $13,955 such that $p_{k,\ Current\ l=1,t=1}$=$13,955. Application of Equation [2] can be repeated, depending upon the number of time points desired. The number of time points in this calculation can be a configurable number (e.g., depending upon a user-specified interval received via a user interface, for instance, every three months for three years). For the sake of brevity, the predicted price $p_k$ at the current location l=1 at two different time points t=0 and t=1 are calculated in this example.

Once $p_{k,\ Current\ l,t=0,t+1\ \ldots\ t+n}$ has been computed, optimization engine 440 may proceed to perform the next step.

E2 (443) Determine a predicted price $p_k$ at any other location at different times (i.e., t=0 and t>0).

First, determine a predicted price $p_k$ for each location other than l=1 (i.e., new l=2, new l=3, etc.), at t=0. This is calculated using Equation [3]. Example outputs are as follows:

$p_{k,new\ l=2,t=0}$=$13,800

$p_{k,new\ l=3,t=0}$=$13,560

$p_{k,new\ l=4,t=0}$=$13,320

$p_{k,new\ l=5,t=0}$=$13,100

$p_{k,new\ l=6,t=0}$=$13,450

$p_{k,new\ l=7,t=0}$=$12,900

$p_{k,new\ l=8,t=0}$=$13,120

$p_{k,new\ l=9,t=0}$=$13,220

$p_{k,new\ l=10,t=0}$=$13,950

Next, determine a predicted price $p_k$ for each location other than l=1 (i.e., new l=2, new l=3, etc.), for t+1 (t=1). Again using Equation [3], optimization engine 440 can generate the following outputs:

$p_{k,new\ l=2,t=1}$=$13,720

$p_{k,new\ l=3,t=1}$=$13,145

$p_{k,new\ l=4,t=1}$=$13,500

$p_{k,new\ l=5,t=1}$=$13,650

$p_{k,new\ l=6,t=1}$=$12,800

$p_{k,new\ l=7,t=1}$=$13,670

$p_{k,new\ l=8,t=1}$=$13,890

$p_{k,new\ l=9,t=1}$=$13,620

$p_{k,new\ l=10,t=1}$=$13,950

As an example, $p_{k,\ new\ l=2,\ t=1}$=$13,720 can be determined using Equation [3] as follows.

$\Sigma\beta Location=\beta 1*Location\ 1(Location\ 1=0)+\beta 11*Location\ 2(Location\ 2=1)+\beta 12*Location\ 3(Location\ 3=0)+\beta 13*Location\ 4(Location\ 4=0)+\beta 14*Location\ 5(Location\ 5=0)+\beta 15*Location\ 6(Location\ 6=0)+\beta 16*Location\ 7(Location\ 7=0)+\beta 17*Location\ 8(Location\ 8=0)+\beta 18*Location\ 9(Location\ 9=0)+\beta 19*Location\ 10(Location\ 10=0)$ βSupply new $l(l2)=\beta 2$*supply of vehicle k (same body style)=β2*50 (i.e., there are 50 vehicles having the same body style at the new location l=2)

βSupply Current $l(l1)=\beta 3$*supply of vehicle k (same body style)=β2*20 (i.e., there are 20 vehicles having the same body style at the current location l=1)

βDemand new $l(l2)=\beta 4$*10 (approximated by the number of dealers buying vehicle k/submakes in particular radius of 30 miles of the new location l=2)

βCompSetSupply new $l(l2)=\beta 5$*40 (competitive body styles of k-i models, e.g., Honda Accord, Ford Fusion, Chevy Malibu, Hyundai Sonata, Nissan Altima, etc., auctioned off at the new location l=2 and date i(t=1))

ΣβVINAttributes=β6*VIN attributes (age, mileage, color, drive train, body style, fuel type)=β61*36 months+β62*39,444+β631*Red(=1 if red, else=0)+β632*White(=1 if white, else=0)+β633*Black(=1 if black, else=0)+β634*Silver (=1 if silver, else=0)+β641*FWD(=1 if FWD, else=0)+β642*AWD/4WD(=1 if AWD/4WD, else=0)+β651*AT(=1 if AT, else=0)+β652*MT (=1 if MT, else=0)+β661*Gasoline(=1 if Gasoline,=0 if not)+β662*Diesel(=1 if Diesel,=0 if not)+β663*Electric(=1 if Electric,=0 if not)+β664*Hybrid(=1 if Hybrid,=0 if not)

$\beta Shipping_{k\ New\ l\ (l2)}=\beta 7$*$500 (shipping cost getting it from the current location l=1 to the new location l=2)

ΣβAuctionCharacteristics new $l(l2)=\beta 81$*10 (representing the number of lanes in the auction house at the new location l=2)+β82*1(=1 if lane 1,=0 if not),β831*West(=1 if West,=0 if not)+β832*East(=1 if East,=0 if not)+β833*South(=1 if South,=0 if not)+β834*North (=1 if North,=0 if not)+β84*10 (the number of makes sold at the new location l=2 and t=1)

$\beta p_{k\ historic\ Current\ l\ (l1),\ t=0}=\beta 9$*$13,750 (average historic price of vehicle k at the current location (l=1) in the last four weeks)

$\beta p_{k\ historic\ New\ l\ (l2),\ t=1}=\beta 9$*$13,250 (average historic price of vehicle k at the new location (l=2) in the last four weeks)

$\Sigma\beta Seasonality_{pk,t=1}=\beta 111$*Jan(=1 if (t=1)=Jan)+β112*Feb+β114*Apr+β115*May(=1 if (t=1)=May)+ . . . β1112*Dec From steps E1 and E2, optimization engine 440 now has predicted price $p_k$ at different locations l (e.g., l=1, l=2, etc.) at different times t (e.g., t=1, t=2, etc.). Thus, optimization engine 440 can proceed to compute a price matrix based on outputs from steps E1 and E2.

E3 (445)—Compute Price Matrix. As illustrated in the example price matrix provided in Table 3 below, the price matrix is computed using outputs from E1 and E2. The computed price matrix contains an array of values corresponding to the plurality of locations and time points determined from E1 and E2. Each value in the array is associated with a specific location at a specific point in time. The computed price matrix may be persisted (e.g., stored in data store 122 of FIG. 1) and/or stored in memory in a transient way (e.g., during a network transaction or session between a network site supported by pricing system 400 (and hence optimization engine 440) and a client device from which a request for pricing the subject vehicle is originated (e.g., via a user interface of the network site) and received by pricing system 400).

In the non-limiting example of Table 3, the different locations are represented in the price matrix as rows and the different time points are represented in the price matrix as columns. Skilled artisans appreciate that other arrangements of the computed values may also be possible.

TABLE 3

| PRICE MATRIX | T0 | T1 | T . . . |
|---|---|---|---|
| L1 | $14,000 | $13,955 | $p_{k,Current\ l=1,t=n}$ |
| L2 | $13,800 | $13,720 | $p_{k,New\ l=2,t=n}$ |
| L3 | $13,560 | $13,145 | $p_{k,new\ l=3,t=n}$ |
| L4 | $13,320 | $13,500 | $p_{k,new\ l=4,t=n}$ |
| L5 | $13,100 | $13,650 | $p_{k,new\ l=5,t=n}$ |
| L6 | $13,450 | $12,800 | $p_{k,new\ l=6,t=n}$ |
| L7 | $12,900 | $13,670 | $p_{k,new\ l=7,t=n}$ |
| L8 | $13,120 | $13,890 | $p_{k,new\ l=8,t=n}$ |
| L9 | $13,220 | $13,620 | $p_{k,new\ l=9,t=n}$ |
| L10 | $13,950 | $13,950 | $p_{k,new\ l=10,t=n}$ |
| L . . . | $p_{k,l=m,t=0}$ | $p_{k,l=m,t=1}$ | $p_{k,new\ l=m,t=n}$ |

E4 (447)—Compare price matrix and determine whether optimization conditions a (482), b (484), c (486) are true or false. For example:

a. When the predicted price $p_k$ at the current location l=1 when t>0 (e.g., t+1, t+2, t+n) is not greater than the predicted price $p_k$ at the current location l=1 at t=0, this optimization condition is not met; go to b. When the predicted price $p_k$ at the current location l=1 when t>0 is greater than the predicted price $p_k$ at the current location l=1 at t=0, this optimization condition is met and the predicted price $p_k$ at the current location l=1 when t>0 is identified (496). This comparison can be repeated for the predicted price $p_k$ at each time point in a plurality of time points of interest, all at the current location l=1, relative to the predicted price $p_k$ at the current location l=1 at the initial point in time t=0.

b. When the predicted price $p_k$ at a new location l>1 at t=0 is not greater than the predicted price $p_k$ at the current location l=1 at t=0, this optimization condition is not met; go to c. When the predicted price $p_k$ at a new location l>1 at t=0 is greater than the predicted price $p_k$ at the current location l=1 at t=0, this optimization condition is met and the predicted price $p_k$ at a new location l>1 at t=0 is identified (494). This comparison can be repeated for the predicted price $p_k$ at each new location in a plurality of new locations of interest, all at the same time t=0, relative to the predicted price $p_k$ at the current location l=1 at the same time t=0.

c. When the predicted price $p_k$ at a new location l>1 when t>0 is not greater than the predicted price $p_k$ at the current location l=1 at t=0, this optimization condition is not met and the predicted price $p_k$ at the current location at t=0 is identified (490). When the predicted price $p_k$ at a new location l>1 when t>0 is greater than the predicted price $p_k$ at the current location l=1 at t=0, this optimization condition is met and the predicted price $p_k$ at a new location l>1 when t>0 is identified (492).

Essentially, multiple types of comparisons are performed in E4. A first type of comparison is keyed to location—holding the current location l=1 and attempting to identify better predicted price(s) in the price matrix at any time point (t>0) subsequent to the initial time point (t=0) at the same current location (l=1). A second type of comparison is keyed to time—holding the time constant and attempting to identify better predicted price(s) in the price matrix at any new location. A third type of comparison is keyed to a specific location (e.g., the current location l=1) at a specific time (e.g., the initial time t=0) and attempts to identify better predicted price(s) in the price matrix at any time point (t>0) subsequent to the initial time point (t=0) at any new location.

When multiple values can be identified from these comparisons (e.g., 490, 492, 494, and 496), a determination can be made as to which value represents the best, optimized price at which the subject vehicle can command, for instance, at auction or wholesale. Based on this determination, a recommendation may be made in the next step E5.

E5—Predicted Price Output

Following the above example price matrix, none of the optimization conditions a, b, or c is met. Accordingly, the final, optimized predicted price $p_k$ in regards to location and time is the same as the predicted price $p_k$ at the current location l (l=1) at the initial time t (t=0), which is $14,000 in this example.

In this way, optimization engine 440 may receive input 412 and operate to evaluate spatial factors (e.g., auction locations 455, 456, 457, 458, 459, 460, 461, 462, 463, 464, 465, 470, etc.) and temporal factors (e.g., auction times 430, 435, 437, etc.) to determine their effects on predicted price valuation and ensure a quantitatively optimized price prediction for a subject vehicle.

Skilled artisans appreciate that Equations [1], [2], and [3] used in computing the predicted price $p_k$ in steps (E1 . . . E5) described above can be expressed in other ways. For example, a generalized formulation for constructing a linear regression model in accordance with a representative embodiment may comprise the following linear expression as implemented on a computing device or system for numerical analysis and optimization:

$$\hat{P}_{\phi,l,t} = \beta_0 + \Sigma\beta_1 L_{\phi,l,t} + \beta_2 S_{\phi,l,t} + \beta_3 D_{\phi,l,t} + \beta_4 S^*_{\phi-\delta,l,t} + \Sigma\beta_5 V_{\phi,l,t} + \beta_6 A_{\phi,l,t} + \beta_7 H_{\phi,l,t} + \Sigma\beta_8 T_{\phi,l,t} + \varepsilon_{\phi,l,t}$$

where:

$\hat{P}_{\phi,l,t}$ is a predicted auction price $\hat{P}$ for vehicle $\phi$ at location l at time t;

$L_{\phi,l,t}$ represents an auction location explanatory variable for modeling how the geographic location of the auction affects the predicted auction price $\hat{P}$ for vehicle $\phi$ at location l at time t;

$S_{\phi,l,t}$ represents a supply (e.g., inventory) explanatory variable for modeling how supply affects the predicted auction price $\hat{P}$ for vehicle $\phi$ at location l at time t;

$D_{\phi,l,t}$ represents a demand explanatory variable (e.g., measured as an estimated number of bidders in attendance at auction that, in a representative embodiment, may be determined via proxy analysis of dealers in the geographic vicinity of location l buying vehicle $\phi$) for modeling how demand affects the predicted auction price $\hat{P}$ for vehicle $\phi$ at location l at time t;

$S^*_{\phi-\delta,l,t}$ represents a competitive supply (e.g., competitive inventory) explanatory variable for modeling how supply of a competitive set of vehicles $\phi-\delta$ affects the predicted auction price $\hat{P}$ for vehicle $\phi$ at location l at time t;

$V_{\phi,l,t}$ represents a vehicle attribute (e.g., year of manufacture, make, model, trim, mileage, color, drive train, body style, fuel type, miles-per-gallon, etc.) explanatory variable for modeling how vehicle attributes affect the predicted auction price $\hat{P}$ for vehicle $\phi$ at location l at time t;

$A_{\phi,l,t}$ represents an auction characteristic (e.g., the number of lanes, whether vehicle $\phi$ will be in a particular lane or not, the number of identical or similar makes sold at auction, etc.) explanatory variable for modeling how auction characteristics affect the predicted auction price $\hat{P}$ for vehicle $\phi$ at location l at time t;

$H_{\phi,l,t}$ represents a historic auction price (e.g., previous auction prices commanded by vehicle $\phi$ at a particular auction during a previous time period—e.g., the last four weeks, etc.) explanatory variable for modeling how historic auction prices affect the predicted auction price $\hat{P}$ for vehicle $\phi$ at location l at time t;

$T_{\phi,l,t}$ represents a seasonal historic auction price (e.g., previous auction prices commanded by vehicle $\phi$ at a particular auction during a particular season—e.g., mid-Spring, etc.) explanatory variable for modeling how seasonal historic auction prices affect the predicted auction price $\hat{P}$ for vehicle $\phi$ at location l at time t;

$\beta_0$ represents the intercept of the linear regression equation (i.e., the value of the criterion when the predictor is equal to zero);

$\{\beta_1, \beta_2, \beta_3, \beta_4, \beta_5, \beta_6, \beta_7, \beta_8\}$ represent linear regression coefficients that are numerically optimized; and $\varepsilon_{\phi,l,t}$ is the standard error term commonly associated with linear regression.

Population of, e.g., historical auction price data into the above linear regression model may proceed with subsequent optimization of the parameters $\beta_i$ to tune the model to conform to the populated historical data. In a representative embodiment, such conformational correspondence may be achieved (or otherwise approximated) via, e.g., minimization of the ordinary least squares difference as between historical auction price data and the modeled linear function. Any numerical optimization method, whether now known or hereafter derived in the art, may be alternatively, conjunctively or sequentially employed to achieve a substantially similar result. See, for example, Numerical Recipes: The Art of Scientific Computing, Third Edition (2007), 1256 pp., Cambridge University Press, ISBN-10: 0521880688, which is incorporated by reference herein. For large data sets, optimization may proceed by a directional derivative and/or gradient approach, e.g., to accelerate conformational convergence of the linear function to the historical auction price data. Historical auction data used to compute and optimize prices may be obtained or received from various sources such as auction source(s) 186 communicatively connected to vehicle data system 120 described above with reference to FIG. 1.

The above-defined expression may be modified and variously implemented to incorporate particular spatial and/or temporal factors. For example:

for evaluation of data corresponding to a current location $l_0$ and the current time $t_0$ . . .

$$\hat{P}_{\phi,l,t} = \beta_0 + \sum \beta_1 L \bigg|_{\substack{\phi \\ l=l_0 \\ t=t_0}} + \beta_2 S \bigg|_{\substack{\phi \\ l=l_0 \\ t=t_0}} + \beta_3 D \bigg|_{\substack{\phi \\ l=l_0 \\ t=t_0}} + \beta_4 S^*\bigg|_{\substack{\phi-\delta \\ l=l_0 \\ t=t_0}} +$$

$$\sum \beta_5 V \bigg|_{\substack{\phi \\ l=l_0 \\ t=t_0}} + \sum \beta_6 A \bigg|_{\substack{\phi \\ l=l_0 \\ t=t_0}} + \beta_7 H \bigg|_{\substack{\phi \\ l=l_0 \\ t=t_0}} + \sum \beta_8 T \bigg|_{\substack{\phi \\ l=l_0 \\ t=t_0}} + \varepsilon_{\phi,l_0,t_0}$$

for evaluation of data corresponding to a current location $l_0$ and a future time $t_n$ . . .

$$\hat{P}_{\phi,l,t} = \beta_0 + \sum \beta_1 L \bigg|_{\substack{\phi \\ l=l_0 \\ t=t_n}} + \beta_2 S \bigg|_{\substack{\phi \\ l=l_0 \\ t=t_n}} + \beta_3 D \bigg|_{\substack{\phi \\ l=l_0 \\ t=t_n}} + \beta_4 S^*\bigg|_{\substack{\phi-\delta \\ l=l_0 \\ t=t_n}} +$$

$$\sum \beta_5 V \bigg|_{\substack{\phi \\ l=l_0 \\ t=t_n}} + \sum \beta_6 A \bigg|_{\substack{\phi \\ l=l_0 \\ t=t_n}} + \beta_7 H \bigg|_{\substack{\phi \\ l=l_0 \\ t=t_n}} + \sum \beta_8 T \bigg|_{\substack{\phi \\ l=l_0 \\ t=t_n}} + \varepsilon_{\phi,l_0,t_n}$$

for evaluation of data corresponding to a new location l' and the current time $t_0$ . . .

$$\hat{P}_{\phi,l,t} = \beta_0 + \sum \beta_1 L \bigg|_{\substack{\phi \\ l=l' \\ t=t_0}} + \beta_2 S \bigg|_{\substack{\phi \\ l=l' \\ t=t_0}} + \beta_3 D \bigg|_{\substack{\phi \\ l=l' \\ t=t_0}} + \beta_4 S^*\bigg|_{\substack{\phi-\delta \\ l=l' \\ t=t_0}} +$$

$$\sum \beta_5 V \bigg|_{\substack{\phi \\ l=l' \\ t=t_0}} + \sum \beta_6 A \bigg|_{\substack{\phi \\ l=l' \\ t=t_0}} + \beta_7 H \bigg|_{\substack{\phi \\ l=l' \\ t=t_0}} + \sum \beta_6 T \bigg|_{\substack{\phi \\ l=l' \\ t=t_0}} + \varepsilon_{\phi,l',t_0}$$

and for evaluation of data corresponding to a new location l' and a future time $t_n$ . . .

$$\hat{P}_{\phi,l,t} = \beta_0 + \sum \beta_1 L \bigg|_{\substack{\phi \\ l=l' \\ t=t_n}} + \beta_2 S \bigg|_{\substack{\phi \\ l=l' \\ t=t_n}} + \beta_3 D \bigg|_{\substack{\phi \\ l=l' \\ t=t_n}} + \beta_4 S^*\bigg|_{\substack{\phi-\delta \\ l=l' \\ t=t_n}} +$$

$$\sum \beta_5 V \bigg|_{\substack{\phi \\ l=l' \\ t=t_n}} + \sum \beta_6 A \bigg|_{\substack{\phi \\ l=l' \\ t=t_n}} + \beta_7 H \bigg|_{\substack{\phi \\ l=l' \\ t=t_n}} + \sum \beta_6 T \bigg|_{\substack{\phi \\ l=l' \\ t=t_n}} + \varepsilon_{\phi,l',t_0}$$

If a linear regression model is formulated to account for spatial factors associated with, for example, an auction being remotely located from the current location of a vehicle (e.g., new location l'), a model in accordance with the following representative embodiment may be alternatively, conjunctively or sequentially employed:

$$\hat{P}_{\phi,l,t} = \beta_0 + \sum \beta_1 L \bigg|_{\substack{\phi \\ l=l' \\ t}} + \beta_2 S \bigg|_{\substack{\phi \\ l=l' \\ t}} + \beta_3 D \bigg|_{\substack{\phi \\ l=l' \\ t}} + \beta_4 S^*\bigg|_{\substack{\phi-\delta \\ l=l' \\ t}} + \sum \beta_5 V \bigg|_{\substack{\phi \\ l=l' \\ t}} +$$

$$\sum \beta_6 A \bigg|_{\substack{\phi \\ l=l' \\ t}} + \beta_7 H \bigg|_{\substack{\phi \\ l=l' \\ t}} + \sum \beta_8 T \bigg|_{\substack{\phi \\ l=l' \\ t}} \beta_9 M \bigg|_{\substack{\phi \\ l=l' \\ t}} + \varepsilon_{\phi,l',t}$$

where the term $$M \bigg|_{\substack{\phi \\ l=l' \\ t}}$$

represents a shipping/storage cost (e.g., associated with moving vehicle $\phi$ to location l' and/or storing vehicle $\phi$ at location l') explanatory variable for modeling how shipping and/or storage costs affect the predicted auction price $\hat{P}$ for vehicle $\phi$ at location l' at time t.

Figure 5:
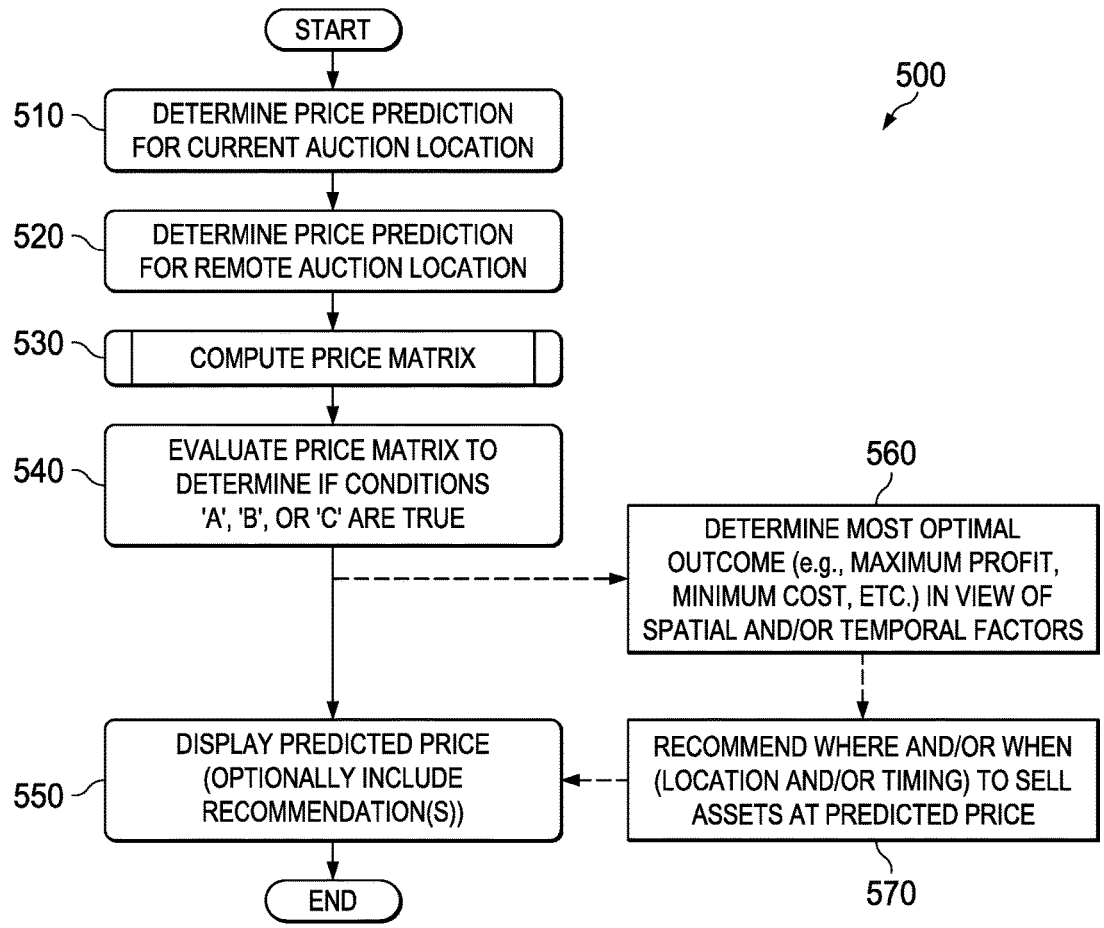
FIG. 5 depicts a flowchart illustration of a data-driven price prediction and optimization method according to some embodiments.

Referring to FIGS. 4 and 5 and following the above automotive example, a representative embodiment of a method for quantitatively optimized auction price prediction may proceed with determination (441, 510) of a price prediction for a current auction location $l_0$ in accordance with the following linear regression model:

$$\hat{P}_{\phi,l,t} = \beta_0 + \sum \beta_1 L\Big|_{\substack{\phi \\ l=l_0 \\ t=t_0}} + \beta_2 S\Big|_{\substack{\phi \\ l=l_0 \\ t=t_0}} + \beta_3 D\Big|_{\substack{\phi \\ l=l_0 \\ t=t_0}} + \beta_4 S^*_{\phi-\delta}\Big|_{\substack{l=l_0 \\ t=t_0}} +$$
$$\sum \beta_5 V\Big|_{\substack{\phi \\ l=l_0 \\ t=t_0}} + \sum \beta_6 A\Big|_{\substack{\phi \\ l=l_0 \\ t=t_0}} + \beta_7 H\Big|_{\substack{\phi \\ l=l_0 \\ t=t_0}} + \sum \beta_8 T\Big|_{\substack{\phi \\ l=l_0 \\ t=t_0}} + \varepsilon_{\phi,l_0,t_0}$$

using historical auction data comprising a plurality of records (see e.g., Table 1).

Such determination (441, 510) of a price prediction for a current auction location $l_0$ may be implemented in any application suitably configured to perform linear regression analysis, such as, for example: a statistics package or library in a programming language, SAS (e.g., Proc reg or proc glm procedure), R (e.g., glm function; see, e.g., http://www.ats.ucla.edu/stat/r/dae/logit.htm), SPSS, Minitab, and/or the like. These terms are known to skilled artisans and thus are not further described herein for the sake of brevity.

Representative coding nomenclature for implementation of linear regression analysis to determine price predictions for a plurality of locations and other factors may comprise, for example:

$\Sigma\beta$Location=$\beta 1$*Location 1(Location 1=1)+
$\beta 11$*Location 2(Location 2=0)+$\beta 12$*Location 3(Location 3=0)+$\beta 13$*Location 4(Location 4=0)+$\beta 14$*Location 5(Location 5=0)+$\beta 15$*Location 6(Location 6=0)+$\beta 16$*Location 7(Location 7=0)+$\beta 17$*Location 8(Location 8=0)+$\beta 18$*Location 9(Location 9=0)+$\beta 19$*Location 10(Location 10=0)

$\beta$Supply Current $l(l1)=\beta 2$*supply of vehicle $k$ (same bodystyle)=$\beta 2$*20

$\beta$Demand Current $l(l1)=\beta 3$*15 (approximated by the number of dealers buying vehicle $k$/submakes in particular radius of 30 miles of the current location)

$\beta$CompSetSupply location $l(l1)=\beta 4$*30 (competitive body styles of $k$-$i$ models, e.g., Honda Accord, Ford Fusion, Chevy Malibu, Hyundai Sonata, Nissan Altima, etc., auctioned off at the current location $l=1$ and time $t=0$ $\rho\Sigma\beta$VINAttributes=$\beta 5$*VIN attributes (age, mileage, color, drive train, bodystyle, fuel type)=$\beta 51$*36 months+$\beta 52$*39,444+$\beta 531$*Red(=1 if red, else=0)+$\beta 532$*White(=1 if white, else=0)+$\beta 533$*Black(=1 if black, else=0)+$\beta 534$*Silver(=1 if silver, else=0)+$\beta 541$*FWD(=1 if FWD, else=0)+$\beta 542$*AWD/4WD(=1 if AWD/4WD, else=0)+$\beta 551$*AT(=1 if AT, else=0)+$\beta 552$*MT(=1 if MT, else=0)+$\beta 561$*Gas(=1 if Gas,=0 if not)+$\beta 562$*Diesel(=1 if Diesel,=0 if not)+$\beta 563$*Electric(=1 if Electric,=0 if not)+$\beta 564$*Hybrid(=1 if Hybrid,=0 if not)

$\Sigma\beta$AuctionCharacteristics current $l(l1)=\beta 61$*10 (representing the number of lanes in the auction house at the current location $l=1$)+$\beta 62$*1(=1 if lane 1,=0 if not),$\beta 631$*West(=1 if West,=0 if not)+$\beta 632$*East(=1 if East,=0 if not)+

$\beta 633$*South(=1 if South,=0 if not)+$\beta 634$*North(=1 if North,=0 if not)+$\beta 64$*10(# of makes sold at current location $l(l=1)$ and on date $i(t=0)$).

Thereafter, the representatively disclosed method may determine (443, 520) a price prediction for a remote auction location l' in accordance with the following linear regression model:

$$\hat{P}_{\phi,l,t} = \beta_0 + \sum \beta_1 L\Big|_{\substack{\phi \\ l=l' \\ t=t_0}} + \beta_2 S\Big|_{\substack{\phi \\ l=l' \\ t=t_0}} + \beta_3 D\Big|_{\substack{\phi \\ l=l' \\ t=t_0}} + \beta_4 S^*_{\phi-\delta}\Big|_{\substack{l=l' \\ t=t_0}} +$$
$$\sum \beta_5 V\Big|_{\substack{\phi \\ l=l' \\ t=t_0}} + \sum \beta_6 A\Big|_{\substack{\phi \\ l=l' \\ t=t_0}} + \beta_7 H\Big|_{\substack{\phi \\ l=l' \\ t=t_0}} + \sum \beta_6 T\Big|_{\substack{\phi \\ l=l' \\ t=t_0}} + \varepsilon_{\phi,l',t_0}$$

The procedure for determining (443, 520) price predictions for a remote auction location l' may be iteratively implemented for a plurality of locations (e.g., 456, 457, 458, 459, 460, 461, 462, 463, 464, 465, 470, etc.), for instance, to compute (445, 530) a component of a price matrix (472) comprising a corresponding plurality of location-specific auction price prediction values (e.g., rows L1, L2, . . . , etc.) at different times.

For each of the plurality of location-specific auction price prediction values, the representatively disclosed method may compute (445, 530) additional information to include in the price matrix (472) corresponding to an associated plurality of time perturbed price predictions for a given location in accordance with the following logistic regression model:

$$\hat{P}_{\phi,l,t} = \beta_0 + \sum \beta_1 L\Big|_{\substack{\phi \\ l=l_0 \\ t=t_n}} + \beta_2 S\Big|_{\substack{\phi \\ l=l_0 \\ t=t_n}} + \beta_3 D\Big|_{\substack{\phi \\ l=l_0 \\ t=t_n}} + \beta_4 S^*_{\phi-\delta}\Big|_{\substack{l=l_0 \\ t=t_n}} +$$
$$\sum \beta_5 V\Big|_{\substack{\phi \\ l=l_0 \\ t=t_n}} + \sum \beta_6 A\Big|_{\substack{\phi \\ l=l_0 \\ t=t_n}} + \beta_7 H\Big|_{\substack{\phi \\ l=l_0 \\ t=t_n}} + \sum \beta_8 T\Big|_{\substack{\phi \\ l=l_0 \\ t=t_n}} + \varepsilon_{\phi,l_0,t_n}$$

The procedure for determining and associated a plurality of time perturbed price predictions for a given location may be iteratively implemented for a plurality of times (e.g., 430, 435, 437, etc.), for instance, to compute (445, 530) a component of a price matrix comprising a corresponding plurality of time-specific auction price prediction values (e.g., columns 474, 476, 478) at different locations.

Representative coding nomenclature for implementation of linear regression analysis to determine price predictions for a plurality of time perturbations may comprise, for example:

$\beta p_{k\ historic\ current\ l\ (l1),\ t=0}=\beta 9$*$13,750 (average historic price of vehicle $k$ at current location ($l1$) in last four weeks)

$\beta p_{k\ historic\ new\ l\ (l2),\ t=1}=\beta 9$*$13,250 (average historic price of vehicle $k$ at new location ($l2$) in last four weeks)

$\Sigma\beta$Seasonality$_{pk,t=1}=\beta 111$*Jan(=1 if $t=0$=Jan)+ $\beta 112$*Feb+ . . . 0.4114*Apr+$\beta 115$*May+ . . . $\beta 1112$*Dec Iterative application of the above-defined procedures (i.e., regression analysis for a plurality of locations at different times) may produce a price matrix as exemplified in Table 4 below.

TABLE 4

| PRICE MATRIX | $t_0$ | $t_1$ | ... $t_n$ |
|---|---|---|---|
| $l_1$ | $14,000 | $13,955 | $\hat{P}_{\phi,l_1,t_n}$ |
| $l_2$ | $13,800 | $13,720 | $\hat{P}_{\phi,l_2,t_n}$ |
| $l_3$ | $13,560 | $13,145 | $\hat{P}_{\phi,l_3,t_n}$ |
| $l_4$ | $13,320 | $13,500 | $\hat{P}_{\phi,l_4,t_n}$ |
| $l_5$ | $13,100 | $13,650 | $\hat{P}_{\phi,l_5,t_n}$ |
| $l_6$ | $13,450 | $12,800 | $\hat{P}_{\phi,l_6,t_n}$ |
| $l_7$ | $12,900 | $13,670 | $\hat{P}_{\phi,l_7,t_n}$ |
| $l_8$ | $13,120 | $13,890 | $\hat{P}_{\phi,l_8,t_n}$ |
| $l_9$ | $13,220 | $13,620 | $\hat{P}_{\phi,l_9,t_n}$ |
| $l_{10}$ | $13,950 | $13,950 | $\hat{P}_{\phi,l_{10},t_n}$ |
| $l_m$ | $\hat{P}_{\phi,l_m,t_0}$ | $\hat{P}_{\phi,l_m,t_1}$ | $\hat{P}_{\phi,l_m,t_n}$ |

In a representative embodiment, auction price optimization may proceed, for example, in accordance with analysis of price matrix elements (447, 540) with respect to the following:

Condition A (element 482 of FIG. 4): $\hat{P}_{\phi,l,t_n} > \hat{P}_{\phi,l,t_z}$ (e.g., comparing a predicted auction price associated with a first time $t_z$ to a predicted price associated with a second time $t_n$, for selling vehicle φ at a given location l); and Condition B (element 484 of FIG. 4): $\hat{P}_{\phi,l_q,t} > \hat{P}_{\phi,l_p,t}$ (e.g., comparing a predicted auction price associated with a first location $l_p$ to a predicted price associated with a second location $l_q$ for selling vehicle φ at given time t); and Condition C (element 486 of FIG. 4): $\hat{P}_{\phi,l_q,t_n} > \hat{P}_{\phi,l_p,t_z}$ (e.g., comparing a predicted auction price associated with a first time $t_z$ and a first location $l_p$ to a predicted price associated with a second time $t_n$, and a second location $l_q$ for selling vehicle φ).

In various representative practical applications of the disclosed method for auction price prediction and optimization, it may be preferable to keep a vehicle at a given location until a favorable time window opens for commissioning the vehicle to auction, rather than ship the vehicle to a distant location for sale at auction. Accordingly, a hierarchy of conditional analysis may be implemented to bias a preference for keeping a vehicle at a given location for a period of time rather than shipping the vehicle to a distant location in accordance with the following:

Firstly, looping over time perturbations for the current location of the vehicle, if the result of Condition A (482) is true (i.e., there exists a time for which an acceptable maximum auction price is predicted to be achievable at the current location of the vehicle), then optimal location-keyed auction price 496 is identified, subject to remaining recursive evaluation (540) of the price matrix with respect to time.

Next in sequence, looping over different locations for a given time, if the result of Condition B (484) is true (i.e., there exists a location for which an acceptable maximum auction price is predicted to be achievable at the given time), then optimal time-keyed auction price 494 is identified, subject to remaining recursive evaluation (540) of the price matrix with respect to location.

Next in sequence, looping over different locations and different times, if the result of Condition C (486) is true (there exists a time and place for which an acceptable maximum auction price is predicted to be achieved), then optimal time-and-location-keyed auction price 492 is identified, subject to remaining recursive evaluation (540) of the price matrix with respect to location and time.

In this example, since none of optimization conditions A (482), B (484), or C (486) is true, the baseline price comparator is reported as the optimal auction price 490.

Iterative application of analysis 447, 540 for all matrix elements (or a substantial portion thereof) may be implemented to quantitatively predict (449) an optimal predicted price that may be commanded by vehicle φ at auction with respect to varying spatial factors (e.g., geographic auction locations 455, 456, 457, 458, 459, 460, 461, 462, 463, 464, 465, 470, etc.) and/or temporal factors (e.g., auction times 430, 435, 437, etc.) and display (550) the same to a client and/or user of pricing system 400 or method 500.

When one of the optimization conditions A (482), B (484), or C (486) might return true, optimization engine 400 may operate to determine (560) the most optimal outcome based the optimization condition that has been met and in view of the spatial and/or temporal factors meeting the optimization condition. Optimization engine 400 may further make a recommendation (570) as to where and when to sell the subject vehicle in accordance with the optimization condition that has been met. The recommendation can be communicated to a client-facing interface (e.g., generated by an embodiment of interface module 192 of vehicle data system 120 or network client interface module 340 of pricing system 300) over the network for presentation (550) on the client device.

Accordingly, various embodiments in accordance with representatively disclosed aspects provide systems and methods capable of predicting the price that a particular vehicle will command at a particular auction at a particular time within, e.g., a 95% confidence interval.

Figure 6:
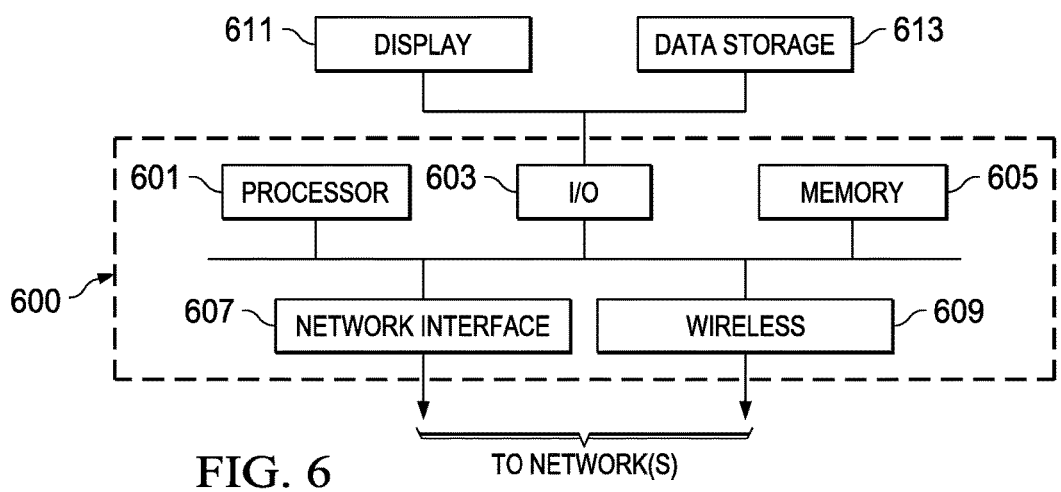
FIG. 6 depicts a diagrammatic representation of one example embodiment of a data processing system suitable for implementing embodiments disclosed herein.

FIG. 6 depicts a diagrammatic representation of one example embodiment of a data processing system suitable for implementing embodiments disclosed herein. As shown in FIG. 6, data processing system 600 may include one or more processor(s) 601 coupled to one or more user input/output (I/O) devices 603 and memory devices 605. Examples of I/O devices 603 may include, but are not limited to, keyboards, displays, monitors, touch screens, printers, electronic pointing devices such as mice, trackballs, styluses, touch pads, or the like. Examples of memory devices 605 may include, but are not limited to, hard drives (HDs), magnetic disk drives, optical disk drives, magnetic cassettes, tape drives, flash memory cards, random access memories (RAMs), read-only memories (ROMs), smart cards, etc. Data processing system 600 can be coupled to display 611, data storage device 613 and various peripheral devices (not shown), such as printers, plotters, speakers, etc. through I/O devices 603. Data processing system 600 may also be coupled to external computers or other devices through network interface 607, wireless transceiver 609, or other means that is coupled to a network such as a local area network (LAN), wide area network (WAN), or the Internet.

Although the invention has been described with respect to specific embodiments herein, these embodiments are merely illustrative, and not restrictive of the disclosure. The description herein of representative embodiments of the invention, including the description in the Abstract and Summary, is not intended to be exhaustive or to limit the disclosure to the precise forms described herein (and in particular, the inclusion of any particular embodiment, feature or function within the Abstract or Summary is not intended to limit the scope of the disclosure to such embodiment, feature or function). Rather, the description is intended to describe illustrative embodiments, features and functions in order to provide a person of ordinary skill in the art context to understand the disclosure without limiting the disclosure to any particularly embodiment, feature or function, including any such embodiment feature or function described in the Abstract or Summary. While specific embodiments of, and examples for, are described herein for illustrative purposes, various substantially equivalent modifications are possible within the spirit and scope of the disclosure, as those skilled in the relevant art will recognize and appreciate. As indicated, such modifications may be made to the disclosure in view of the foregoing description of representative embodiments and are to be included within the spirit and scope of the disclosure. Thus, while various representative embodiments have been described herein, a latitude of modification, various changes and substitutions are intended for inclusion in the disclosure, and it will be appreciated that in some instances some features of various representative embodiments may be employed without corresponding use of other features without departing from the scope and spirit of the disclosure as set forth herein. Therefore, many modifications may be made to adapt a particular situation or material to the essential scope and spirit of the disclosure.

Reference throughout this specification to "one embodiment", "an embodiment", or "a specific embodiment" or contextual variants thereof, means that a particular feature, structure, or characteristic described in connection with the subject embodiment is included in at least one embodiment and may not necessarily be present in all embodiments. Accordingly, respective appearances of the phrases "in one embodiment", "in an embodiment", or "in a specific embodiment" or contextual variants thereof, in various places throughout this specification, are not necessarily referring to the same or even related embodiments. Furthermore, the particular features, structures, or characteristics of any particular embodiment may be combined in any suitable manner with one or more other embodiments. It will be understood that other variations and modifications of the representative embodiments described and illustrated herein are possible in light of the teachings herein and are to be considered as part of the spirit and scope of the disclosure.

In the description herein, numerous specific details are provided, such as examples of components and/or methods, to provide a thorough understanding of various representative embodiments. One skilled in the relevant art will recognize, however, that a particular embodiment may be able to be practiced without one or more of the specific details recited, or with other apparatuses, systems, assemblies, methods, components, materials, parts, and/or the like. In other instances, well-known structures, components, systems, materials, or operations are not specifically shown or described in detail to avoid unnecessarily obscuring aspects of embodiments of the invention. While the invention may be illustrated with respect to a particular embodiment, this is not and does not limit the invention to any specific embodiment, and a person of ordinary skill in the art will recognize that additional embodiments are readily understandable and contemplated and included in this disclosure.

Representative embodiments discussed herein may be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices may include a keyboard, monitor, printer, electronic pointing device (for example, mouse, trackball, stylus, touch pad, etc.), and/or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor, whether now known or hereafter derived in the art. For example, a computer-readable medium may refer to a data cartridge, a data backup magnetic tape, a floppy diskette, a flash memory drive, an optical data storage drive, a CD-ROM, ROM, RAM, HD, and/or the like. The processes described herein may be implemented in suitable computer-executable instructions that may reside on a computer readable medium (for example, a disk, CD-ROM, a memory, etc.). Alternatively, conjunctively or sequentially, computer-executable instructions may be stored as software code components on a direct access storage device array, magnetic tape, floppy diskette, optical storage device, and/or other appropriate computer-readable medium or storage device.

Any suitable programming language may be used, individually or in conjunction with another programming language, to implement the routines, methods or programs of various representative embodiments described herein, including C, C++, Java, JavaScript, HTML, or any other programming or scripting language, etc. Other software/hardware/network architectures may be used. For example, the functions of variously disclosed embodiments may be implemented on one computer or shared/distributed among two or more computers in or across a network. Communications between computers implementing representative embodiments can be accomplished using any electronic, optical, radio frequency signals, or other suitable methods and/or tools of communication in compliance with known network protocols.

Different programming techniques may be employed such as procedural or object oriented. Any particular routine can execute on a single computer-processing device or multiple computer processing devices, a single computer processor or multiple computer processors. Data may be stored in a single storage medium or distributed through multiple storage media, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative or conjunctive embodiments may be performed at substantially the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein may be implemented in the form of control logic in software or hardware or a combination of both. Control logic may be stored in an information storage medium, such as a computer-readable medium, as a plurality of instructions adapted to direct an information-processing device to perform a set of steps disclosed in the various embodiments. Based on the disclosure and teachings provided herein, a person of ordinary skill in the art will appreciate other ways and/or methods to implement various embodiments disclosed herein.

It is also within the spirit and scope of the invention to implement, in software programming or code, any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented using software programming or code in one or more digital computers, by using application specific integrated circuits, programmable logic devices, field programmable gate arrays; optical, chemical, biological, quantum or nano-engineered systems, components and mechanisms may be alternatively, conjunctively or sequentially used. In general, various functions of disclosed representative embodiments can be achieved by any means now known or hereafter derived in the art; for example, distributed or networked systems, components and circuits may be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example, but not limited to, an electronic, magnetic, optical, electromagnetic, infrared, or semiconductor system, apparatus, system, device, propagation medium, or computer memory. Such computer-readable media are generally machine-readable and include software programming or code that can be human readable (e.g., source code) or machine readable (e.g., object code). Examples of non-transitory computer-readable media may include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art will appreciate, a computer program product implementing various embodiments disclosed herein may comprise one or more non-transitory computer readable media storing computer instructions translatable by one or more processors in a computing environment.

A "processor" includes any hardware system, mechanism or component that processes data, signals or other information. A processor may include a system with a central processing unit, an application-specific processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing may be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other contextual variant thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein, the meaning of "in" includes "in" and "on" unless the context clearly dictates otherwise. The scope of the disclosure should be determined by the following claims and their legal equivalents.

What is claimed is:

1. A method for auction pricing optimization over a network, comprising:
    receiving, by a data platform from a client device, an asset pricing request containing information about an asset, the data platform operating on at least one server machine and supporting a network site, the client device communicatively connected to the data platform over the network;
    determining, by an optimization engine running on the data platform, a predicted price for the asset at each of a plurality of locations at each of a plurality of times;
    computing, by the optimization engine, a price matrix containing a plurality of values for the predicted price, each value of the plurality of values associated with a specific location of the plurality of locations at a specific time of the plurality of times;
    identifying, by the optimization engine from among the plurality of values at the plurality of locations relative to the plurality of times in the price matrix, an optimized predicted price for the asset by:
        for a given location of the plurality of locations, comparing values associated with different times of the plurality of times;
        for a given time of the plurality of times, comparing values associated with different locations of the plurality of locations; and
        for a given location of the plurality of locations at a given time of the plurality of times, comparing values associated with different locations of the plurality of locations at different times of the plurality of times;
    generating a view for presentation of the optimized predicted price for the asset on the client device; and
    communicating the view to the client device over the network.

2. The method according to claim 1, wherein the determining comprises:
    determining a predicted price for the asset at a given location at each of the plurality of times; and determining a predicted price for the asset at different locations of the plurality of locations other than the given location at each of the plurality of times.

3. The method according to claim 1, wherein the determining comprises:
computing a linear regression model that defines a set of input variables with associated regression coefficients, the set of input variables comprising a first input variable representing supply of the asset at a given location of the plurality of locations, a second input variable representing supply of the asset at different locations of the plurality of locations other than the given location, and a third input variable representing supply of competitive assets at the given location.

4. The method according to claim 1, wherein the asset is a vehicle.

5. The method according to claim 4, wherein the determining comprises:
computing a linear regression model that defines a set of input variables with associated regression coefficients, the set of input variables comprising input variables representing attributes describing the vehicle.

6. The method according to claim 1, wherein the asset pricing request is for pricing a plurality of assets, wherein the information contained in the asset pricing request further includes information about each of the plurality of assets, wherein the determining, the computing, and the identifying are performed for each of the plurality of assets, and wherein the view comprises an optimized predicted price for each of the plurality of assets.

7. The method according to claim 1, wherein the asset comprises a set of vehicles, wherein the information contained in the asset pricing request further includes information about each of the set of vehicles, wherein the determining comprises performing a valuation of the set of vehicles with respect to the plurality of locations and the plurality of times.

8. A system for auction pricing optimization over a network, comprising:
a data platform operating on at least one server machine and supporting a network site, each of the at least one server machine comprising at least one processor and at least one non-transitory computer readable medium storing instructions translatable by the at least one processor to perform:
receiving, from a client device, an asset pricing request containing information about an asset, the client device communicatively connected to the data platform over the network;
determining a predicted price for the asset at each of a plurality of locations at each of a plurality of times;
computing a price matrix containing a plurality of values for the predicted price, each value of the plurality of values associated with a specific location of the plurality of locations at a specific time of the plurality of times;
identifying, from among the plurality of values at the plurality of locations relative to the plurality of times in the price matrix, an optimized predicted price for the asset by:
for a given location of the plurality of locations, comparing values associated with different times of the plurality of times;
for a given time of the plurality of times, comparing values associated with different locations of the plurality of locations; and for a given location of the plurality of locations at a given time of the plurality of times, comparing values associated with different locations of the plurality of locations at different times of the plurality of times;
generating a view for presentation of the optimized predicted price for the asset on the client device; and
communicating the view to the client device over the network.

9. The system of claim 8, wherein the determining comprises:
determining a predicted price for the asset at a given location at each of the plurality of times; and
determining a predicted price for the asset at different locations of the plurality of locations other than the given location at each of the plurality of times.

10. The system of claim 8, wherein the determining comprises:
computing a linear regression model that defines a set of input variables with associated regression coefficients, the set of input variables comprising a first input variable representing supply of the asset at a given location of the plurality of locations, a second input variable representing supply of the asset at different locations of the plurality of locations other than the given location, and a third input variable representing supply of competitive assets at the given location.

11. The system of claim 8, wherein the asset is a vehicle.

12. The system of claim 11, wherein the determining comprises:
computing a linear regression model that defines a set of input variables with associated regression coefficients, the set of input variables comprising input variables representing attributes describing the vehicle.

13. The system of claim 8, wherein the asset pricing request is for pricing a plurality of assets, wherein the information contained in the asset pricing request further includes information about each of the plurality of assets, wherein the determining, the computing, and the identifying are performed for each of the plurality of assets, and wherein the view comprises an optimized predicted price for each of the plurality of assets.

14. The system of claim 8, wherein the asset comprises a set of vehicles, wherein the information contained in the asset pricing request further includes information about each of the set of vehicles, wherein the determining comprises performing a valuation of the set of vehicles with respect to the plurality of locations and the plurality of times.

15. A computer program product for auction pricing optimization over a network, the computer program product comprising at least one non-transitory computer readable medium storing instructions translatable by the at least one processor to perform:
receiving, from a client device, an asset pricing request containing information about an asset, the client device communicatively connected to a data platform over the network, the data platform operating on at least one server machine and supporting a network site, the at least one server machine comprising the at least one processor and the at least one non-transitory computer readable medium;
determining a predicted price for the asset at each of a plurality of locations at each of a plurality of times;
computing a price matrix containing a plurality of values for the predicted price, each value of the plurality of values associated with a specific location of the plurality of locations at a specific time of the plurality of times;

identifying, from among the plurality of values at the plurality of locations relative to the plurality of times in the price matrix, an optimized predicted price for the asset by:

for a given location of the plurality of locations, comparing values associated with different times of the plurality of times;

for a given time of the plurality of times, comparing values associated with different locations of the plurality of locations; and for a given location of the plurality of locations at a given time of the plurality of times, comparing values associated with different locations of the plurality of locations at different times of the plurality of times;

generating a view for presentation of the optimized predicted price for the asset on the client device; and communicating the view to the client device over the network.

16. The computer program product of claim 15, wherein the determining comprises:

determining a predicted price for the asset at a given location at each of the plurality of times; and determining a predicted price for the asset at different locations of the plurality of locations other than the given location at each of the plurality of times.

17. The computer program product of claim 15, wherein the determining comprises:

computing a linear regression model that defines a set of input variables with associated regression coefficients, the set of input variables comprising a first input variable representing supply of the asset at a given location of the plurality of locations, a second input variable representing supply of the asset at different locations of the plurality of locations other than the given location, and a third input variable representing supply of competitive assets at the given location.

18. The computer program product of claim 15, wherein the asset is a vehicle and wherein the determining comprises:

computing a linear regression model that defines a set of input variables with associated regression coefficients, the set of input variables comprising input variables representing attributes describing the vehicle.

19. The computer program product of claim 15, wherein the asset pricing request is for pricing a plurality of assets, wherein the information contained in the asset pricing request further includes information about each of the plurality of assets, wherein the determining, the computing, and the identifying are performed for each of the plurality of assets, and wherein the view comprises an optimized predicted price for each of the plurality of assets.

20. The computer program product of claim 15, wherein the asset comprises a set of vehicles, wherein the information contained in the asset pricing request further includes information about each of the set of vehicles, wherein the determining comprises performing a valuation of the set of vehicles with respect to the plurality of locations and the plurality of times.

* * * * *